(12) United States Patent
Kandasamy et al.

(10) Patent No.: US 11,811,730 B1
(45) Date of Patent: Nov. 7, 2023

(54) DETERMINING DOMAIN NAME SYSTEM FORWARDING RULES IN A MULTI-CLOUD ENVIRONMENT

(71) Applicant: International Business Machines Corporation, Armonk, NY (US)

(72) Inventors: Malarvizhi Kandasamy, Bangalore (IN); James K Wong, Austin, TX (US); Sudheesh S. Kairali, Kerala (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/045,606

(22) Filed: Oct. 11, 2022

(51) Int. Cl.
  *H04L 29/12* (2006.01)
  *H04L 29/06* (2006.01)
  *H04L 29/08* (2006.01)
  *H04L 61/5046* (2022.01)
  *H04L 61/4511* (2022.01)

(52) U.S. Cl.
  CPC ...... *H04L 61/5046* (2022.05); *H04L 61/4511* (2022.05)

(58) Field of Classification Search
  None
  See application file for complete search history.

(56) References Cited

U.S. PATENT DOCUMENTS

| | | | |
|---|---|---|---|
| 9,215,212 | B2 | 12/2015 | Reddy et al. |
| 9,544,278 | B2 | 1/2017 | Hozza et al. |
| 9,779,113 | B2 | 10/2017 | Beevers |
| 10,608,983 | B2 | 3/2020 | Prince et al. |
| 11,252,126 | B1 | 2/2022 | Thunga et al. |
| 2012/0173760 | A1 | 7/2012 | Jog et al. |

(Continued)

FOREIGN PATENT DOCUMENTS

| CN | 113364892 A | | 9/2021 |
|---|---|---|---|
| CN | 113992759 A | * | 1/2022 |

(Continued)

OTHER PUBLICATIONS

Desai; "Centralized DNS Management of Hybrid Cloud with Amazon Route 53 and AWS Transit Gateway"; Networking & Content Delivery; May 3, 2019; 5 Pages.

(Continued)

*Primary Examiner* — Christopher B Robinson
(74) *Attorney, Agent, or Firm* — CANTOR COLBURN LLP; Tihon Poltavets

(57) ABSTRACT

An example method for determining domain name system (DNS) forwarding rules is provided. The method includes training a machine learning model to generate recommended DNS forwarding rules and determine whether a DNS resolver is experiencing an DNS resolver issue. The method further includes receiving a DNS query at the DNS resolver which is one of a plurality of DNS resolvers forming a network of DNS resolvers. The method further includes identifying a chain of DNS resolvers of the network of DNS resolvers based at least in part on the DNS query and a DNS response to the DNS query. The method further includes analyzing the DNS query and the DNS response using the machine learning model to generate a DNS forwarding rule and to identify whether any of the DNS resolvers of the network of DNS resolvers is experiencing the DNS resolver issue.

18 Claims, 21 Drawing Sheets

(56) References Cited

U.S. PATENT DOCUMENTS

| | | | |
|---|---|---|---|
| 2019/0097965 A1* | 3/2019 | Linari | H04L 63/168 |
| 2020/0137024 A1* | 4/2020 | Janakiraman | H04L 63/0236 |
| 2021/0256386 A1* | 8/2021 | Wieman | G06N 3/044 |
| 2022/0078210 A1* | 3/2022 | Crabtree | G06F 16/9024 |
| 2022/0247769 A1* | 8/2022 | Erlingsson | H04L 67/535 |

FOREIGN PATENT DOCUMENTS

| | | | |
|---|---|---|---|
| EP | 3021534 B1 | 5/2016 | |
| GB | 2572323 A * | 10/2019 | G06F 16/27 |

OTHER PUBLICATIONS

Naik; "Multi Cloud Private DNS Forwarding"; Published in Searce; Retrieved Online from https://blog.searce.com/multi-cloud-private-dns-forwarding-a77718e2a3f9; Jan. 24, 2022; 23 Pages.

Pappas et al.; "Distributed DNS Troubleshooting"; SIGCOMM'04 Workshops; Aug. 30-Sep. 3, 2004; pp. 265-270.

* cited by examiner

| query_ duration_ns | response_ code | initial_ resolver | resolver0-resolver0 | resolver0-resolver1 | resolver0-resolver2 | resolver0-resolver3 | resolver1-resolver0 | resolver1-resolver1 | resolver1-resolver2 | ... | resolver3-resolver3 |
|---|---|---|---|---|---|---|---|---|---|---|---|
| 30 | 0 | 0 | 0 | 1 | 0 | 0 | 0 | 0 | 0 | ... | 0 |
| 300 | 0 | 0 | 0 | 1 | 0 | 0 | 0 | 0 | 1 | ... | 0 |
| ... | ... | ... | ... | ... | ... | ... | ... | ... | ... | ... | ... |
| 1 | 0 | 1 | 0 | 0 | 0 | 0 | 0 | 0 | 0 | ... | 0 |

FIG. 4

FIG. 6A (601)
- Header
- Message ID: 50010, etc.
- Question
- www.example.com IN A
- Answer
- Additional
- resolver0.local UPSTREAM resolver1.local

FIG. 6B (602)
- Header
- Message ID: 50010, etc.
- Question
- www.example.com IN A
- Answer
- Additional
- resolver0.local UPSTREAM resolver1.local
- resolver1.local UPSTREAM resolver3.local

FIG. 6C (603)
- Header
- Rcode: NOERROR, Message ID: 50010, etc.
- Question
- www.example.com IN A
- Answer
- www.example.com IN A 127.0.0.1
- Additional
- resolver0.local UPSTREAM resolver1.local
- resolver1.local UPSTREAM resolver3.local

FIG. 6D (604)
- Header
- Rcode: NOERROR, Message ID: 50010, etc.
- Question
- www.example.com IN A
- Answer
- www.example.com IN A 127.0.0.1
- Additional
- resolver0.local UPSTREAM resolver1.local
- resolver1.local UPSTREAM resolver3.local

| account_id | qname | qtype | query_duration_ms | rcode | initial_resolver | resolver0-resolver0 | resolver0-resolver1 | ... | resolver3-resolver3 |
|---|---|---|---|---|---|---|---|---|---|
| 555 | www.example.com | 1 | 98 | 0 | 0 | 0 | 1 | ... | 0 |
| ... | ... | ... | ... | ... | ... | ... | ... | ... | ... |
| 555 | www.example.com | 28 | 10 | 0 | 2 | 0 | 0 | ... | 0 |

*FIG. 10A*

| query_duration_ms | rcode | initial_resolver | resolver0-resolver0 | resolver0-resolver1 | ... | resolver3-resolver3 |
|---|---|---|---|---|---|---|
| 98 | 0 | 0 | 0 | 1 | ... | 0 |
| ... | ... | ... | ... | ... | ... | ... |
| 10 | 0 | 2 | 0 | 0 | ... | 0 |

*FIG. 10B*

| account_id | qname | qtype | query_duration_ms | rcode | final_attempted_resolver |
|---|---|---|---|---|---|
| 555 | www.example.com | 1 | 98 | 0 | 2 |
| ⋮ | ⋮ | ⋮ | ⋮ | ⋮ | ⋮ |
| 555 | www.example.com | 28 | 300 | 2 | 3 |

FIG. 17A 1700

| query_duration_ms | rcode | final_attempted_resolver |
|---|---|---|
| 98 | 0 | 3 |
| ⋮ | ⋮ | ⋮ |
| 10 | 0 | 3 |

DETERMINING DOMAIN NAME SYSTEM FORWARDING RULES IN A MULTI-CLOUD ENVIRONMENT

BACKGROUND

Embodiments described herein generally relate to processing systems, and more specifically, to determining domain name system (DNS) forwarding rules in a hybrid cloud environment.

DNS systems translate requests for domain names into internet protocol (IP) addresses. DNS systems can be public or private.

Public DNS systems provide domain name to IP address translation for publicly available resources and are often provided by an internet service provider (ISP). In public DNS systems, records are available to the public and can be accessed regardless of who or what device is being used or the network on which the device resides.

Private DNS systems provide domain name to IP address translation within a private environment (e.g., a private network, a private cloud). A private DNS system is different than a public DNS system in that a private DNS system typically resides behind a firewall and contains records of internal sites for the private environment. In some cases, a private DNS system is limited in its scope to remembering IP addresses from the internal sites and services being used and is not accessible outside of the private environment.

A multi-cloud environment is made up of multiple clouds, such as multiple public clouds, multiple private clouds, or one or more public clouds and one or more private clouds. A multi-cloud environment made up of one or more public clouds and one or more private clouds is referred to as a "hybrid cloud environment" or a "hybrid multi-cloud environment."

SUMMARY

In one exemplary embodiment, a computer-implemented method for determining domain name system (DNS) forwarding rules is provided. The method includes training a machine learning model to generate recommended DNS forwarding rules and determine whether a DNS resolver is experiencing an DNS resolver issue. The method further includes receiving a DNS query at the DNS resolver which is one of a plurality of DNS resolvers forming a network of DNS resolvers. The method further includes identifying a chain of DNS resolvers of the network of DNS resolvers based at least in part on the DNS query and a DNS response to the DNS query. The method further includes analyzing the DNS query and the DNS response using the machine learning model to generate a DNS forwarding rule and to identify whether any of the DNS resolvers of the network of DNS resolvers is experiencing the DNS resolver issue.

Other embodiments described herein implement features of the above-described method in computer systems and computer program products.

The above features and advantages, and other features and advantages, of the disclosure are readily apparent from the following detailed description when taken in connection with the accompanying drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 4 depicts a table of datasets representing the performance of the network of resolvers of FIG. 3 according to one or more embodiments described herein;

FIGS. 6A-6D depict tables of hop location metadata for the DNS response graph of FIG. 5 according to one or more embodiments described herein;

FIGS. 10A and 10B depict tables of data according to one or more embodiments described herein;

FIGS. 17A and 17B depict tables of data according to one or more embodiments described herein;

Figure 1:
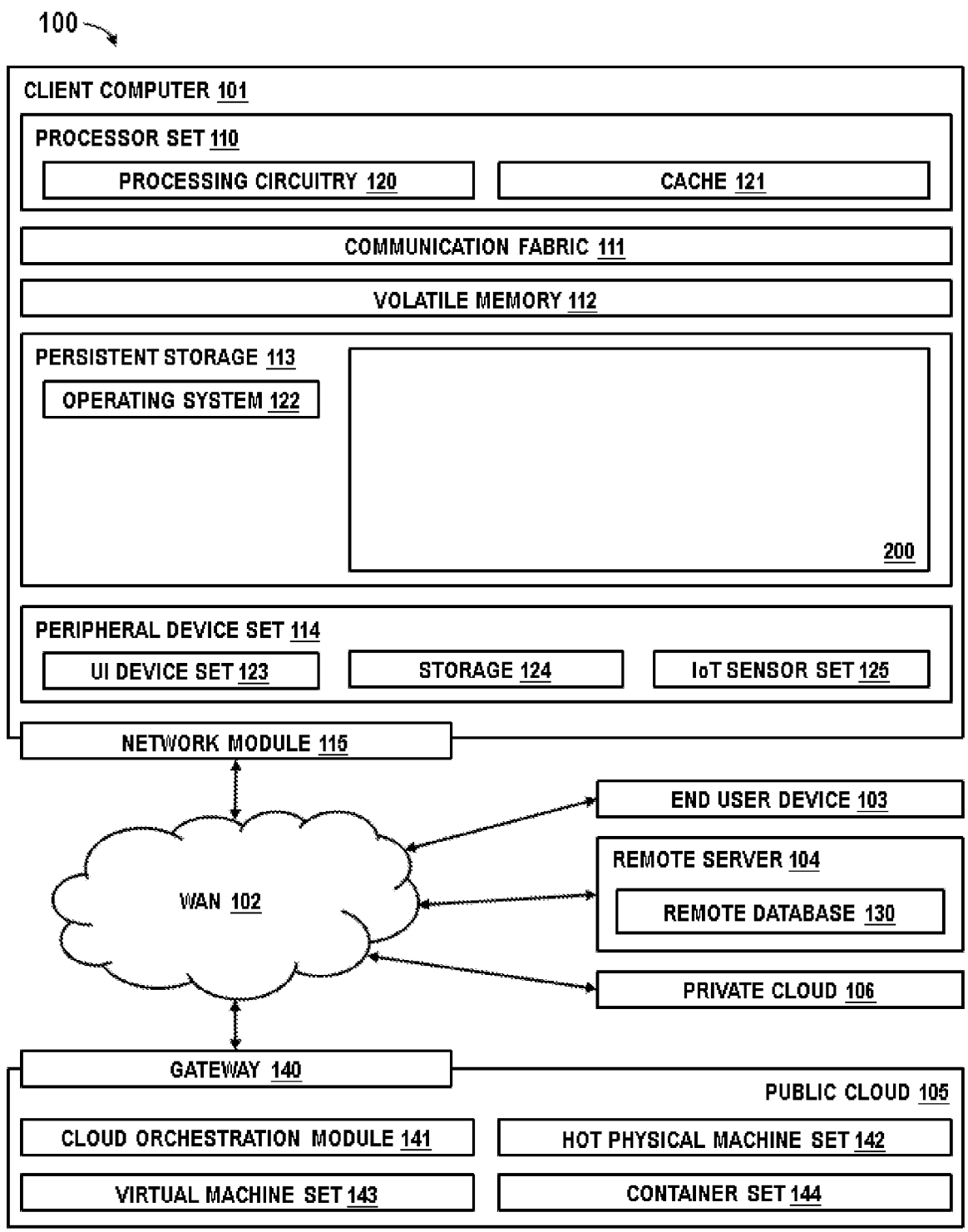
FIG. 1 depicts a block diagram of a processing system for implementing one or more embodiments described herein.

The diagrams depicted herein are illustrative. There can be many variations to the diagram or the operations described therein without departing from the scope of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

One or more embodiments of the present invention provides for determining domain name system (DNS) forwarding rules in a hybrid cloud environment.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as determining DNS forwarding rules in a hybrid cloud environment 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

One or more embodiments described herein can utilize machine learning techniques to perform tasks, such as determining DNS forwarding rules in a hybrid cloud environment. More specifically, one or more embodiments described herein can incorporate and utilize rule-based decision making and artificial intelligence (AI) reasoning to accomplish the various operations described herein, namely determining DNS forwarding rules in a hybrid cloud environment. The phrase "machine learning" broadly describes a function of electronic systems that learn from data. A machine learning system, engine, or module can include a trainable machine learning algorithm that can be trained, such as in an external cloud environment, to learn functional relationships between inputs and outputs, and the resulting model (sometimes referred to as a "trained neural network," "trained model," and/or "trained machine learning model") can be used for determining DNS forwarding rules in a hybrid cloud environment, for example. In one or more embodiments, machine learning functionality can be implemented using an artificial neural network (ANN) having the capability to be trained to perform a function. In machine learning and cognitive science, ANNs are a family of statistical learning models inspired by the biological neural networks of animals, and in particular the brain. ANNs can be used to estimate or approximate systems and functions that depend on a large number of inputs. Convolutional neural networks (CNN) are a class of deep, feed-forward ANNs that are particularly useful at tasks such as, but not limited to, analyzing visual imagery and natural language processing (NLP). Recurrent neural networks (RNN) are another class of deep, feed-forward ANNs and are particularly useful at tasks such as, but not limited to, unsegmented connected handwriting recognition and speech recognition. Other types of neural networks are also known and can be used in accordance with one or more embodiments described herein.

ANNs can be embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based on experience, making ANNs adaptive to inputs and capable of learning. For example, an ANN for handwriting recognition is defined by a set of input neurons that can be activated by the pixels of an input image. After being weighted and transformed by a function determined by the network's designer, the activation of these input neurons are then passed to other downstream neurons, which are often referred to as "hidden" neurons. This process is repeated until an output neuron is activated. The activated output neuron determines which character was input. It should be appreciated that these same techniques can be applied in the case of determining DNS forwarding rules in a hybrid cloud environment as described herein.

Systems for training and using a machine learning model are now described in more detail with reference to FIG. 2. Particularly, FIG. 2 depicts a block diagram of components of a machine learning training and inference system 200 according to one or more embodiments described herein. The system 200 performs training 202 and inference 204. During training 202, a training engine 216 trains a model (e.g., the trained model 218) to perform a task, such as to determine DNS forwarding rules in a hybrid cloud environment. Inference 204 is the process of implementing the trained model 218 to perform the task, such as to determine DNS forwarding rules in a hybrid cloud environment, in the context of a larger system (e.g., a system 226). All or a portion of the system 200 shown in FIG. 2 can be implemented, for example by all or a subset of the computing environment 100 of FIG. 1.

The training 202 begins with training data 212, which may be structured or unstructured data. According to one or more embodiments described herein, the training data 212 includes one-dimensional arrays representing the summary performance of a network of resolvers. The training engine 216 receives the training data 212 and a model form 214. The model form 214 represents a base model that is untrained. The model form 214 can have preset weights and biases, which can be adjusted during training. It should be appreciated that the model form 214 can be selected from many different model forms depending on the task to be performed. For example, where the training 202 is to train a model to perform image classification, the model form 214 may be a model form of a CNN. The training 202 can be supervised learning, semi-supervised learning, unsupervised learning, reinforcement learning, and/or the like, including combinations and/or multiples thereof. For example, supervised learning can be used to train a machine learning model to classify an object of interest in an image. To do this, the training data 212 includes labeled images, including images of the object of interest with associated labels (ground truth) and other images that do not include the object of interest with associated labels. In this example, the training engine 216 takes as input a training image from the training data 212, makes a prediction for classifying the image, and compares the prediction to the known label. The training engine 216 then adjusts weights and/or biases of the model based on results of the comparison, such as by using backpropagation. The training 202 may be performed multiple times (referred to as "epochs") until a suitable model is trained (e.g., the trained model 218).

Once trained, the trained model 218 can be used to perform inference 204 to perform a task, such as to determine DNS forwarding rules in a hybrid cloud environment. The inference engine 220 applies the trained model 218 to new data 222 (e.g., real-world, non-training data). For example, if the trained model 218 is trained to classify images of a particular object, such as a chair, the new data 222 can be an image of a chair that was not part of the training data 212. In this way, the new data 222 represents data to which the trained model 218 has not been exposed. The inference engine 220 makes a prediction 224 (e.g., a classification of an object in an image of the new data 222) and passes the prediction 224 to the system 226 (e.g., the computing environment 100 of FIG. 1). The system 226 can, based on the prediction 224, taken an action, perform an operation, perform an analysis, and/or the like, including combinations and/or multiples thereof. In some embodiments, the system 226 can add to and/or modify the new data 222 based on the prediction 224.

In accordance with one or more embodiments, the predictions 224 generated by the inference engine 220 are periodically monitored and verified to ensure that the inference engine 220 is operating as expected. Based on the verification, additional training 202 may occur using the trained model 218 as the starting point. The additional training 202 may include all or a subset of the original training data 212 and/or new training data 212. In accordance with one or more embodiments, the training 202 includes updating the trained model 218 to account for changes in expected input data.

In a hybrid multi-cloud environment, DNS name resolution occurs in different environments. For example, the DNS name solution could occur in a private cloud or other vendor specific individual public clouds. In such an environment, when a user requests to access an application, the application searches a DNS resolver and detects where to resolve the DNS query.

An application may be unaware of where the DNS name resolution happens. For example, an application may only receive an IP address to process the application. There are scenarios where it may be useful for an application to know where the name resolution happens, whether it is happening in a private cloud location or in public cloud location, and/or the like, including combinations and/or multiples thereof. Without such information, the application may not be able to support more complex features that improve the performance of DNS resolvers networked together in a hybrid multi-cloud environment.

One or more embodiments described herein addresses these and other shortcomings by revealing to an application the chain of DNS resolvers used to perform DNS name resolution. Based on the chain of DNS resolvers, one or more embodiments can automatically determine a set of DNS request forwarding behaviors/rules for the DNS resolvers to optimize performance, reliability, etc. and target desired goals. For example, a DNS forwarding loop can occur due to inappropriate configuration of DNS conditional forwarding rules. In a hybrid multi-cloud environment, a DNS resolver in one cloud may forward to DNS resolvers in other cloud, which ends up forwarding back to the original DNS resolver. This is known as a DNS forwarding loop, and is inefficient. Forwarding rules across DNS resolvers in a DNS forwarding loop can be improved by eliminating intermediate servers in between the two DNS resolvers that actually resolve the DNS request (also referred to as "DNS query"). One or more embodiments described herein reduces DNS forwarding loops by using data probed from the DNS resolvers involved in the DNS forwarding loop. For example, machine learning can be used to generate a recommendation to attempt to address the DNS forwarding loop by eliminating unnecessary intermediate servers in the DNS forwarding loop.

Further, some conventional approaches to provide fault tolerance and DNS load balancing for DNS resolvers involve using a round robin approach. In the round robin approach, the requests are distributed substantially evenly across the IP addresses/servers with the assumption that each of application servers is substantially the same in terms of availability, computing performance, and load handling characteristics. As scale increases, the number of servers must also be increased because upgrading less than all of the existing servers or even adding higher performance servers would not improve efficiency because the round robin approach does not distribute more requests to high performing servers.

One or more embodiments described herein addresses these and other shortcomings by using a machine learning approach to train a machine learning model that analyzes the DNS resolvers for a certain duration. The machine learning model provides recommendations, based on the network latency (number of hops), round trip time (RTT), time taken to resolve the DNS query, success rate, time of DNS query, inbound/outbound policies, and/or the like, including combinations and/or multiples thereof. The forwarding rules, configurations, and associated data can be saved for later learning/training/re-training.

According to one or more embodiments described herein, DNS resolvers in the forwarding network may be degrading, down (e.g., off, offline, etc.), or not responding due to load or other issues. The trained machine learning model can then detect whether a DNS resolver is degrading and provide a recommendation to address this. According to one or more embodiments, an autocorrection action may be used to correct DNS forwarding rules automatically to resolve a DNS looping issue, degrading DNS resolvers, and/or other errors in the DNS resolution system.

One or more embodiments described herein provide for using machine learning to suggest a performant arrangement of forwarding logic across any number of considered networks. With continued reference to FIG. 2, the trained model 218 receives an input (e.g., a set of metrics in numerical form that, when provided to the trained model 218, leads to the expected mathematical output) and generates an output (e.g., a mathematical representation of the topology of a network of resolvers). Considering first the output, when one DNS resolver within one subnet of one cloud is unable to resolve a DNS query by itself, it forwards the DNS query to another DNS resolver that may be on the same subnet of the same cloud. In this situation, the two DNS resolvers become connected and form a network of DNS resolvers. As long as this forwarding logic connecting the two DNS resolvers remain the same, even if they become separated to different subnets in the same cloud or different clouds all together (e.g., two virtual private clouds (VPCs), one VPC and one on-premise private cloud, and/or the like, including combinations and/or multiples thereof), the topology of the network representing the intended forwarding logic remains the same. Even if more clouds and more resolvers are considered, as long as topology of the network remains the same, then the logic remains preserved. Machine learning performs mathematical operations onto the input, providing some mathematical output. Accordingly, the output is a mathematical representation of the topology of a network of resolvers.

Just as machine learning uses a mathematical format for the output, it uses a mathematical format for the input. The performance of a system may be subjective but is definable and quantifiable. According to one or more embodiments described herein, a measure of a system's performance is the aggregation of one or more metrics, each representing a facet of the user-defined definition of a performant system. Accordingly, the input is a set of metrics in numerical form that, when provided to the trained model 218, leads to the expected mathematical output.

After the machine learning model is trained (e.g., the trained model 218), the inference engine 220 receives a stream of input data sets (e.g., new data 222) from the live system (e.g., the system 226) that is being managed. According to an example, a probing mechanism is used to test the performance of a current network of DNS resolvers. To support the probing mechanism, each DNS resolver in the network can have a DNS request positioning system. For each resolver the DNS message lands on, the receiving resolver creates a metadata record in the DNS message with a new record type about the hop to primarily note that the receiving resolver has been reached. With this, by the time the DNS message request has hopped across the DNS resolvers used to resolve the request, the DNS message has returned back to the initial DNS resolver that initially received the DNS message request from some DNS client with enough metadata to describe the paths the request took. This effectively forms a directed sub-graph of the network. This directed sub-graph of the network, along with metrics regarding this DNS message, forms an input dataset for the trained machine learning model.

According to one or more embodiments described herein, the stream of input data sets (e.g., the new data 222) can continuously apprise the trained model 218 of the current state, such as at a user-prescribed frequency. The stream of input data can be saved in a database. Feeding the stream of input data sets into the trained model 218 provides for the trained model 218 to continuously make recommended topological organization of considered resolvers to fit a current situation.

According to one or more embodiments described herein, one or more controllers is provided. The controller, like the DNS-request positioning system logger, is applied on top of existing DNS resolvers on the network. As the trained model 218 makes recommendations, if needed, then the DNS resolver forwarding rules at each node/hop can be updated by the controller according to a user-defined policy of frequency.

According to one or more embodiments described herein, one or more of the components described herein are added on top of existing technologies. Accordingly, one or more embodiments can be safely disabled, and the network of resolvers will run normally as before.

According to one or more embodiments described herein, methods, systems, and/or computer program products are provided, which identify DNS resolver issues and auto configure DNS forwarding rules for a DNS query in a hybrid, multi cloud environment. One or more embodiments provides for remembering, for a DNS request, a chain of DNS resolvers, which the current DNS request visits while traveling to various DNS resolvers through current forwarding rules. One or more embodiments provides for determining new DNS resolver forwarding rules and configuration update suggestions with a trained machine learning model. One or more embodiments provides for removing DNS request forwarding loops from the resolver network. One or more embodiments provides for removing offline DNS resolvers not functioning correctly from the resolver network. One or more embodiments provides for a resolver network to optimize user-defined performance that saves suggested configuration recommendations and associated data for later learning and improvements for the machine learning model and/or automates DNS forwarding rules and configuration updates based on the trained machine learning model's suggestions (e.g., network cost, network latency (number of hops), Round trip Time (RTT), time taken to resolve the DNS query, success rate, time of DNS query, policies, and/or the like, including combinations and/or multiples thereof).

An embodiment for an automated, orchestration style system with user approval mechanisms is now described with reference to FIGS. 3-10B.

Figure 3:
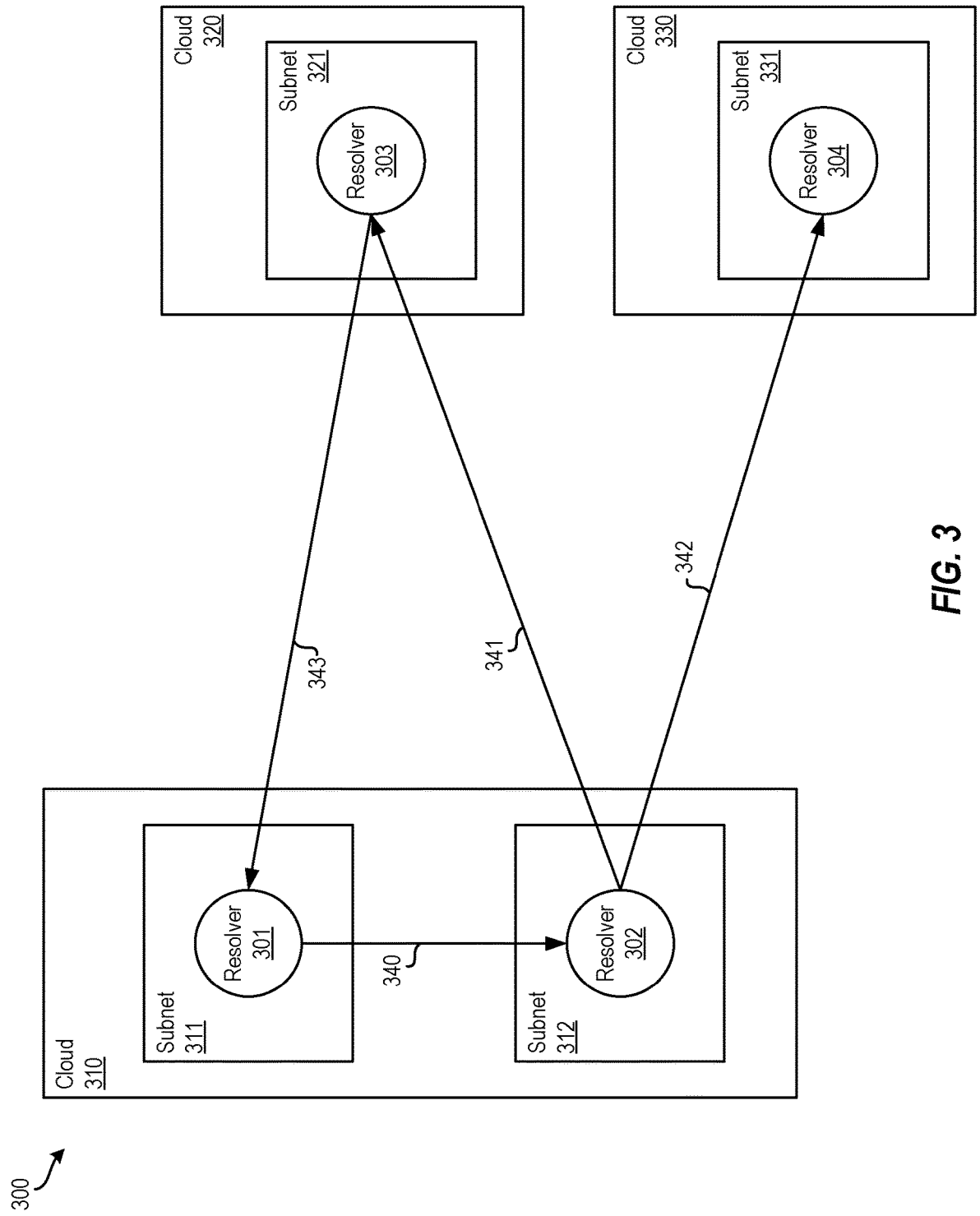
FIG. 3 depicts a resolver request forwarding graph 300 for a network of resolvers before applying a suggestion according to one or more embodiments described herein.

FIG. 3 depicts a resolver request forwarding graph 300 for a network of resolvers before applying a suggestion according to one or more embodiments described herein. The resolver request forwarding graph 300 represents a network of resolvers 301, 302, 303, 304 deployed within clouds 310, 320, 330 as shown. According to an embodiment, the network of resolvers manages multiple virtual private clouds (e.g., clouds 310, 320, 330) across different providers and on-premise private clouds owned by one entity. Each cloud 310, 320, 330 has its own resolver or resolvers, as shown. For example, the cloud 310 includes the resolver 301 within subnet 311 and resolver 302 within subnet 312, the cloud 320 includes the resolver 303 within subnet 321, and the cloud 330 includes the resolver 304 within subnet 311. Different contributing factors may contribute to DNS resolution latencies, including different geographical distances between one cloud and another, different computing capabilities between one resolver and another, bandwidth limitations between resolvers, and/or the like, including combinations and/or multiples thereof. Also, one or more of the resolvers 301-304 may be powered by different DNS resolution applications, resulting in different configuration languages used. As shown by the links 340, 341, 342, 343, the one or more of the resolvers 301-304 may reference one or more of the resolvers 301-304 when resolving a DNS request. For example, when the resolver 301 receives a DNS request, the resolver 301 references the resolver 302 via the link 340. The resolver 302 then references the resolvers 303 and 304 via the links 341 and 342 respectively. As shown, the resolver 303 references back to the resolver 301 via the link 343, which may return a DNS result (or "answer") to the resolver 301 responsive to the DNS request.

FIG. 4 depicts a table 400 of datasets representing the performance of the network of resolvers of FIG. 3 according to one or more embodiments described herein. For example, as the resolvers 301-304 process the DNS request to generate the DNS result, data about the performance of the network of resolvers 301-304 can be collected, and an example of such data is represented in the table 400.

With continued reference to FIG. 3, according to this embodiment, a performant network of resolvers is one that has a relatively high rate of responses with non-SERVFAIL response codes ("rcode"), a relatively low rate of DNS query timeouts, and relatively low DNS query times. A DNS request that results in a SERVFAIL response could indicate that one of the resolvers 301-304 along the hops encountered some internal error, which is preferably avoided. A DNS request that results in a DNS query timeout could indicate that an internal error has occurred and/or a network error is causing one of the hops to become unable to receive the request or unable to send back a response, which is also preferably avoided. However, one of more reasons applications like web servers are slow to respond are long DNS query durations, so DNS requests with shorter query times are desirable. With these properties involving rates, time also becomes another factor. Also, the path of resolvers a DNS request took from the existing forwarding rule set is considered. It is desired to avoid malfunctioning resolvers in the path (e.g., forwarding loops (DNS looping) and/or the like). It is also desired to minimize the end effect of error response codes and high query durations, and so, avoiding those should minimize undesired quantities in the network of resolvers 301-304.

In order to constrain a dataset to a finite set of features, some aggregating is performed. First, for example, the data for a single dataset (see, e.g., FIG. 4) is received or collected from network traffic for the network of resolvers 301-304 across a sample period (e.g., 5 minutes, 10 minutes, 30 minutes, and/or the like). The dataset can include query duration, response code, an initial resolver identifier, and indicators for the performance of resolver pairs (see, e.g., FIG. 4). The dataset can also include request metadata, which can be sorted by query duration. As an example, four request metadata arrays are chosen from the dataset, each representing a quartile of the range of query durations that occurred during the sample period. For a given DNS request from the full metadata set, the response code, the query duration, and the two-dimensional adjacency matrix representing the path the DNS request took through the network of resolvers 301-304 unrolled into a one-dimensional array are concatenated into a one-dimensional array. Each of the four request data arrays are concatenated into a single one-dimensional array representing the summary performance of the current network of resolvers 301-304, for example.

Figure 5:
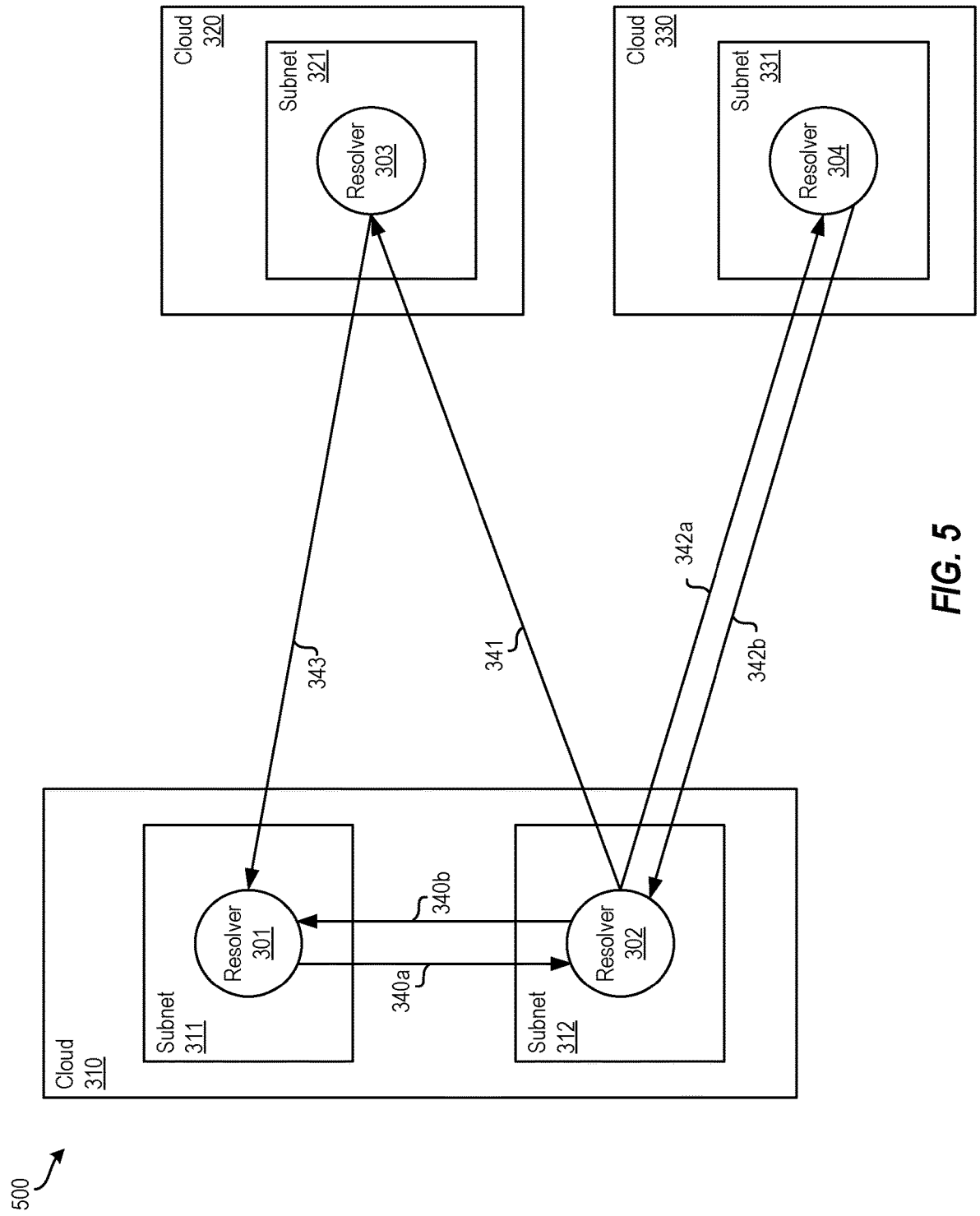
FIG. 5 depicts DNS response graph for the network of resolvers of FIG. 3 with hop location metadata according to one or more embodiments described herein.

FIG. 5 depicts DNS response graph 500 for the network of resolvers 301-304 of FIG. 3 according to one or more embodiments described herein. In this example, a DNS request is passed from the resolver 301 to the resolver 302 via the link 340a. The resolver 302 then passes the DNS request to the resolver 303 via the link 341 and the resolver 304 via the link 342a. The resolver 303 returns a DNS response to the resolver 301 via the link 343. The resolver 304 returns a DNS response to the resolver 302 via the link 342b, and the resolver 302 passes the DNS response to the resolver 301 via the link 340b. Along the graph 500, each of the resolvers 301-304 passes, along with the DNS request/response, hop location metadata, which forms the "additional" section (see, e.g., FIGS. 6A-6D).

For example, FIGS. 6A-6D depict tables 601, 602, 603, 604 of hop location metadata for the DNS response graph 500 of FIG. 5 according to one or more embodiments described herein. With reference to FIG. 5, the table 601 represents hop location metadata passed from the resolver 301 to the resolver 302. The table 602 represents hop location metadata passed from the resolver 302 to the resolver 304. The table 603 represents hop location metadata passed from the resolver 304 to the resolver 303. The table 602 represents hop location metadata passed from the resolver 302 to the resolver 301.

The hop location metadata of the tables 601-604 can be used at training data 212 to train the trained model 218. According to an embodiment, the tables 601-604 are represented as one-dimensional arrays representing the summary performance of the network of resolvers 301-304, which are then used as the training data 212. In order to gather datasets for training 202 the trained model 218, the a DNS request positioning system logger is implemented onto each of the resolvers 301-304 using an UPSTREAM record type. The DNS request positioning system logger processes and adds the hop location metadata (see tables 601-604) to the DNS request message in the additional section to note the current resolver and the resolver to which the current resolver intends to forward the request. This one record of metadata with these two location points represents the edge that is the path the request will take. Then, the resolver forwards the request accordingly.

In a DNS operation, once a response is generatable, the request is copied into the response. According to one or more embodiments described herein, the hop location metadata in the additional section is also copied into to the response so that the hop location metadata travels back to the originating resolver with the response. Once the response reaches back to the originating resolver, the hop location metadata is saved into a historical database with attributes to represent the sample dataset and/or attributes that may help with querying or other purposes.

For example, some DNS resolvers (e.g., Bind9, CoreDNS, and other implementations) have a plugin infrastructure that can provide for add-on features with complex and custom logic. According to an embodiment, the resolvers 301-304 can be implemented using CoreDNS. For each CoreDNS-enabled resolver, a modified variant of the open-source "forward" plugin called the "lrforward" plugin, short for "location-recorded forward" plugin, can be implemented. This modification is made so that once the existing forwarding logic in the plugin has chosen the target upstream resolver address, additional custom logic generates and appends UPSTREAM resource records into the data structure representing the DNS request message before sending it out into the network. This is shown in the following example pseudocode:

root@malar-test:~# dig db-0.private-cloud.database
; << >> DiG 9.11.3-1ubuntu1.16-Ubuntu << >> db-0.private-cloud.database
;; global options: +cmd
;; Got answer:
;; ->>HEADER<<- opcode: QUERY, status: NOERROR, id: 38660
;; flags: qr rd ra; QUERY: 1, ANSWER: 1, AUTHORITY: 0, ADDITIONAL: 1
;; QUESTION SECTION:
; db-0.private-cloud.database. IN A
;; ANSWER SECTION:
db-0.private-cloud.database. 900INA3.3.3.3
;; ADDITIONAL SECTION:
provider1.db-0.private-cloud.database. 300146 IN UPSTREAM 10.128.1.4
provider2.db-0.private-cloud.database. 308505 IN UPSTREAM 10.215.134.162 provider3.db-0.private-cloud.database. 303470 IN UPSTREAM 10.190.197.11
provider1.db-0.private-cloud.database. 303470 IN UPSTREAM 10.240.97.20
;; Query time: 218 msec
;; SERVER: 127.0.0.53#53(127.0.0.53)
;; WHEN: Fri Dec 24 06:29:59 UTC 2021
;; MSG SIZE rcvd: 72

According to one or more embodiments described herein, the "Additional Section" portion of the pseudocode, namely a number of hops, a response code ("rcode"), and a duration, can be input into the trained model 218 to generate a routing recommendation as further described herein.

In a multi cloud, the additional records section for the DNS query contains resource records that relate to the query but are not strictly answers for the query. As shown in FIG. 3, the resolvers 301-304 can reside at multiple cloud locations. The DNS query traverses multiple clouds, and the domain name is resolved. By having the chain of resolvers in DNS query, additional section, how a DNS query is resolved can be learned/identified.

Consider the following example where the forwarding flow is from resolver_n–1 to resolver_n by that spec.
resolver_0_hostname UPSTREAM resolver_0_ip
resolver_1_hostname UPSTREAM resolver_1_ip
resolver_1_hostname UPSTREAM resolver_2_ip
. . .
resolver_n_hostname UPSTREAM resolver_n_ip The additional section shows the list of each of the DNS resolver IP addresses and can aid in detecting any DNS loop or any other errors that occurred in the system as will be further described. Also, the DNS resolvers are stored in a history table to know how a DNS query resolves the domain name.

According to one or more embodiments described herein, there is a second, custom plugin for the CoreDNS resolvers known as a "reporter" plugin. This "reporter" plugin executes its logic before the customized "forward" plugin. The logic for the "reporter" plugin is to initialize an HTTP client when CoreDNS starts up and to simply pass the DNS request down to the "lrforward" plugin when received. However, after the "lrforward" plugin receives the response from an upstream resolver and passed it back up to the "reporter" plugin, the "reporter" plugin performs additional processing onto the data returned by the "lrforward" plugin. The "reporter" plugin looks at the DNS message data structure and check to see if the first UPSTREAM resource record's source resolver address is its own. If so, then that means that this CoreDNS resolver was the initial resolver in this chain, and that it would have the responsibility to report back to the controller with the DNS-request positioning location data points noting the full path this DNS request message took on the network to store that information in the associated SQL database. After the "reporter" plugin parses the UPSTREAM records into a JSON payload, "reporter" plugin will initiate an HTTP request to send a JSON payload to the controller an API endpoint on the controller. Then, a controller can convert that payload into an SQL query to store the data into the appropriate database (e.g., an SQL database or the like).

Figure 7:
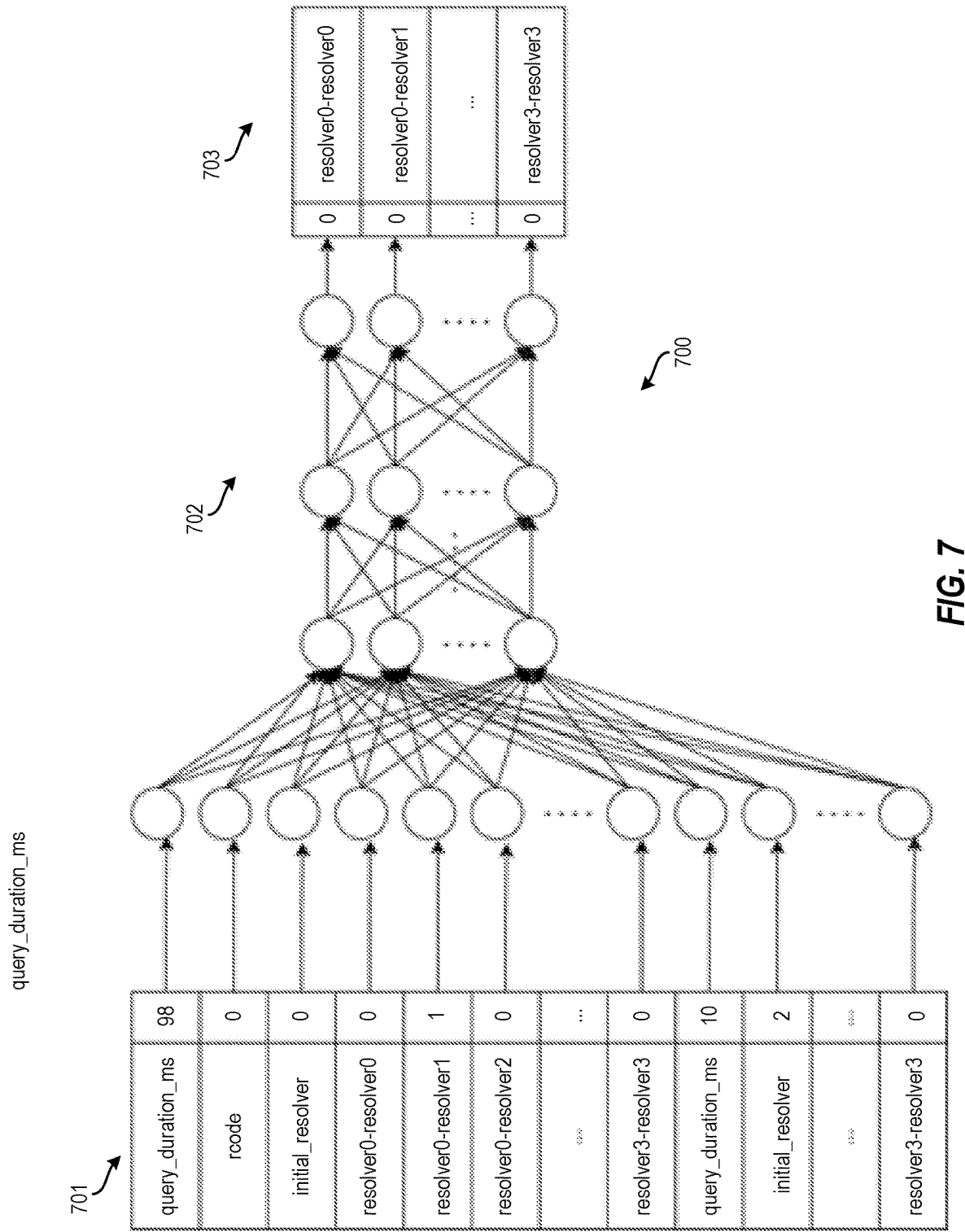
FIG. 7 depicts an example neural network according to one or more embodiments described herein.

Turning now to FIG. 7, an example neural network 700 is shown according to one or more embodiments described herein. The neural network 700 takes input data 701, processes the input data through one or more hidden layers 702, and generates an output 703, which recommends forwarding rules. According to an embodiment, the trained model 218 of FIG. 2 is the neural network 700. The input 701 to the neural network 700 is a one-dimensional array representing the summary performance of the network of resolvers 301-304. The input 701 can have the same features considered, in the same format, as a dataset from the training set (e.g., the same features at the training data 212). The neural network 700 can be initially trained with some prepared dataset to prefer outputs that contain paths of the lower or lowest query durations with accurate response codes while avoiding containing paths of the higher or highest query durations and inaccurate response codes. Malfunctioning resolvers can be identified by an error code in a response, and the existence of forwarding loops can also be inferred by high query durations, which aids to avoid these scenarios.

When in use, the sample dataset is fed into the trained model 218 (e.g., the neural network 700) to produce recommended forwarding rules (e.g., the output 703) for the resolvers 301-304. According to one or more embodiments described herein, the output 703 is encoded as an adjacency matrix modelling the recommended forwarding rules as a code agnostic format that is a directed graph of resolvers. According to one or more embodiments described herein, the neural network 700 can take as input select sample datasets and resulting suggestions into its training set to become better at recommending forwarding rules. Different neural network architectures can be implemented in different examples. As one such example, the neural network 700 can have a neural network architecture suitable for processing time-series data. According to an embodiment, the neural network 700 is a convolutional neural network. According to an embodiment, the neural network 700 is a recurrent neural network.

Figure 8:
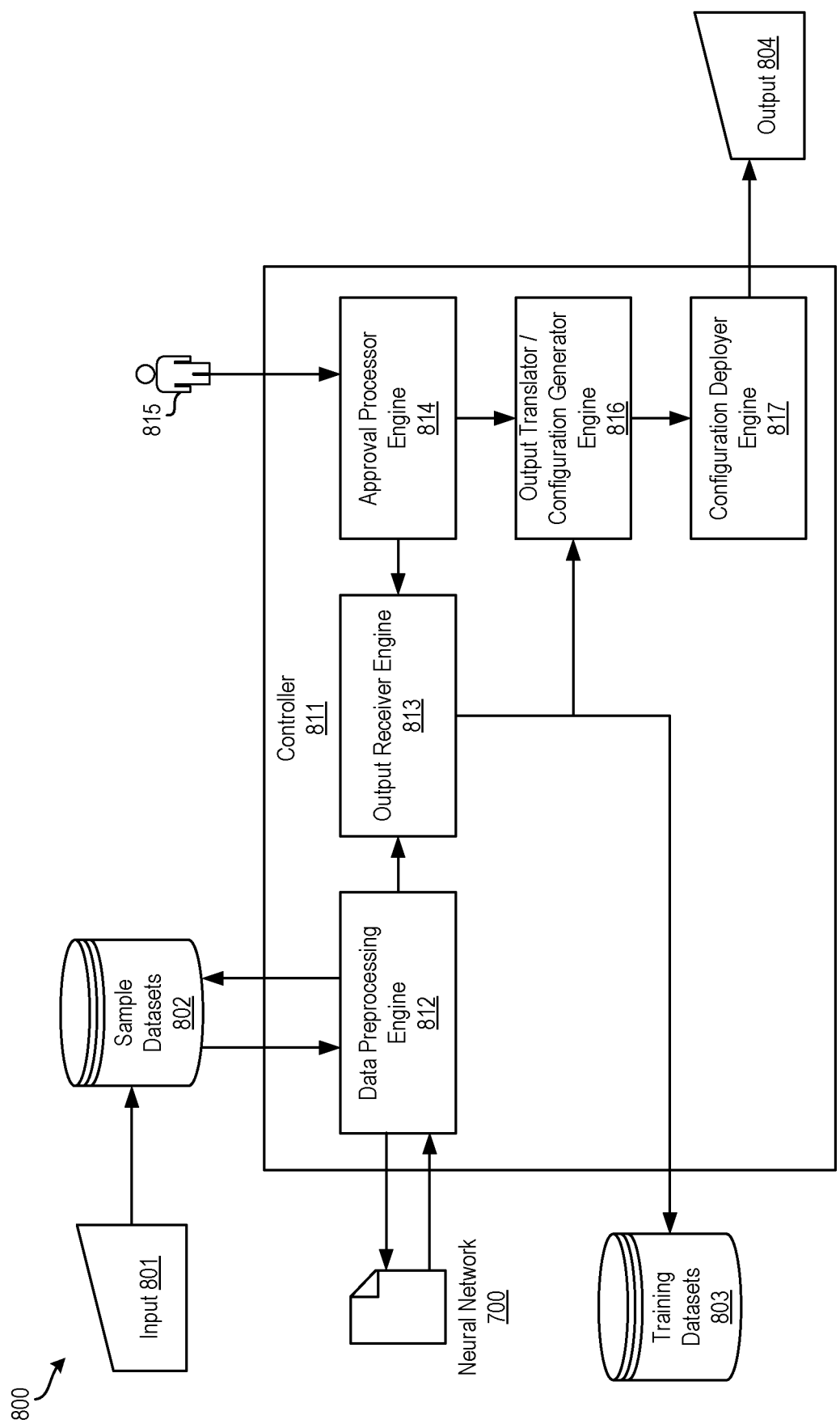
FIG. 8 depicts a system showing a controller for selecting sample datasets and applying results using an approval-based approach according to one or more embodiments described herein.

FIG. 8 depicts a system 800 having a controller 811 for selecting sample datasets and applying results using an approval-based approach according to one or more embodiments described herein. The controller 811 can be any suitable system or device, such as the computing environment 100 of FIG. 1. The controller 811 receives sample data sets 802 based on input 801 and generates an output 804, which indicates forwarding rules. The controller 811 includes a data preprocessing engine 812, an output receiver engine 813, an approval processor 814, an output translator/configuration generator engine 816, and a configuration deployer engine 817.

The controller 811 uses the data preprocessing engine 812 to perform inference using the neural network 700, which generates a recommended configuration (e.g., forwarding rules) for a network of resolvers. The recommendation is received at the output receiver engine 813. A human operator 815 can review and/or modify the recommendation using the approval processor engine 814. For example, in this embodiment, the intent is to provide for the human operator 815 to make decisions to maintain stability, accountability, and effectiveness of the network of resolvers. For example, the human operator 815 can review and approve (or not) suggested forwarding rules as determined by the data preprocessing engine 812 based on the neural network 700 (e.g., the trained model 218).

Figure 9A:
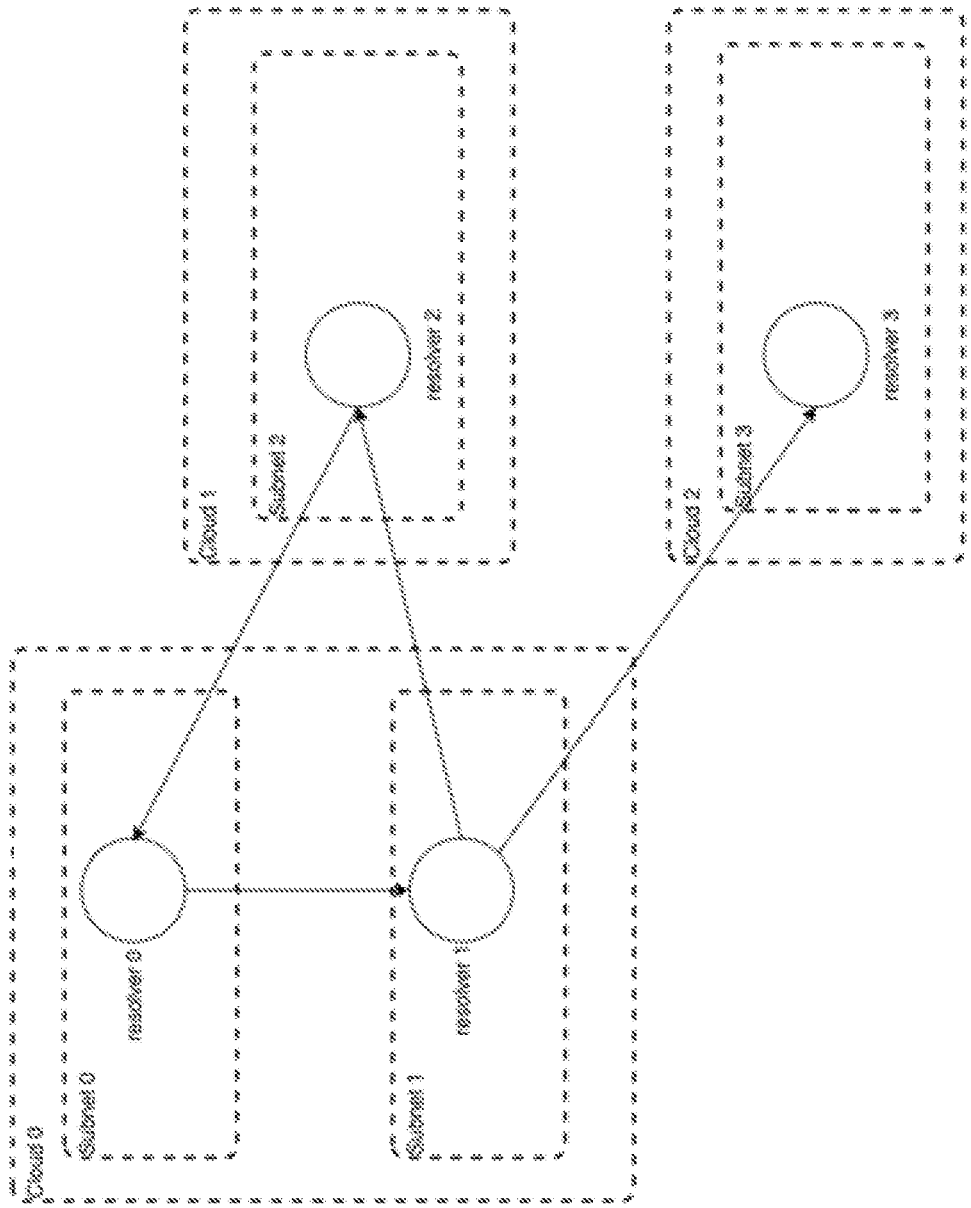
FIG. 9A depicts an original network graph according to one or more embodiments described herein.

Input 801 represent data collected during a sampling period for a network of resolvers, such as the network 900 shown in FIG. 9A. The input 801 is stored in the sample datasets 802. At the end of each sampling period, for example, or at other suitable times, the controller 811 pulls and processes the sample datasets 802, which can include hop forwarding metadata as described herein, into a format that is recognizable and fed into the neural network 700. For example, the sample datasets 802 can store data in the form of table 1000 of FIG. 10A, and the data preprocessing engine 812 can format the data from table 1000 into data as shown in the table 1001 of FIG. 10B. For each suggested configuration of resolvers (from FIG. 9A) in a graph format that the model outputs, the controller 811 generates a notification to the human operator 815 for review using the approval processor engine 814. The human operator can then respond to two choices as follows.

First, the human operator 815 has the option to modify the output from the data preprocessing engine 812 (e.g., a suggested forwarding rule) based on expertise and/or experience of the human operator 815 to provide for the functionality of network of resolvers to remain nominal. The human operator 815 can choose whether or not to make use of the suggested configuration (e.g., the output from the data preprocessing engine 812) or the one after manual improvements was made. The human operator 815 can then choose whether or not to submit an anonymized sample dataset (e.g., to the training datasets 803) to improve the neural network 700 during subsequent training, so that future results are improved.

Figure 9B:
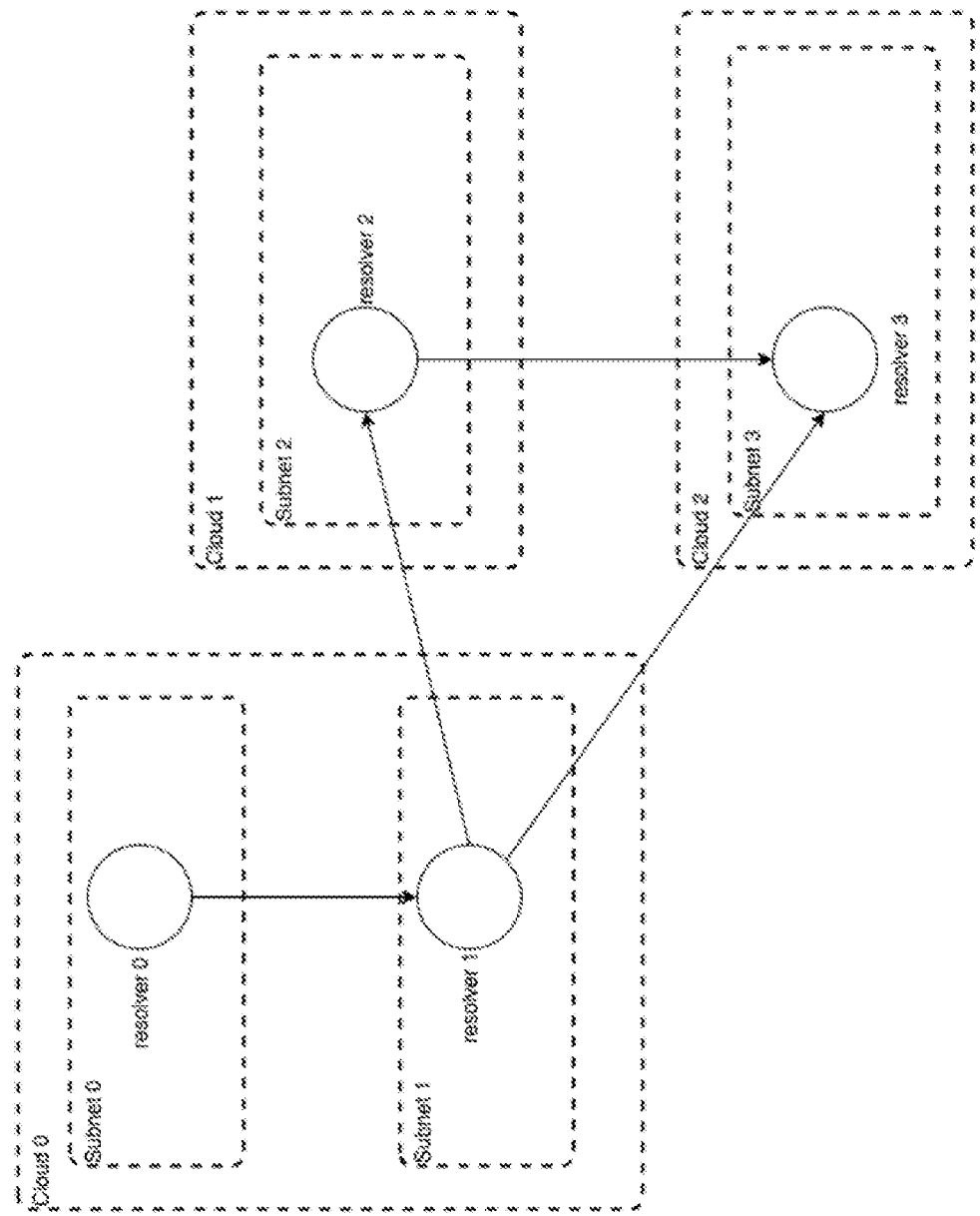
FIG. 9B depicts a recommended network graph according to one or more embodiments described herein.

Should the operator choose to apply the suggested configuration, the controller 811 translates the suggested forwarding rules into configurations suitable for different resolvers, since resolvers of different implementations may use different configuration syntax and formats. For each node that is a resolver (see, e.g., FIG. 9A), the controller 811 can consider adjacent nodes with a directed edge as a forwarding target. The controller 811, using the output translator/configuration generator engine 816, then converts that information into the configuration rules in that resolver's configuration language, updates the configuration, and apples the configuration to update the resolver behavior. The configuration can then be deployed as output 804 using the configuration deployer engine 817. FIG. 9B shows a recommended network graph 901 that results from the output 804 of the controller 811.

In an embodiment where the resolvers of FIG. 9A are CoreDNS resolvers, the resolvers also have the open-source "reload" plugin enabled through the CoreDNS resolver configuration that is the Corefile as described herein. For each resolver, if any of the edges emanating from the resolver in the original network graph (e.g., FIG. 9A) is different than the set of edges emanating from the resolver in the recommended network graph (FIG. 9B), the controller 811 connects to the resolver using a secure connection. The controller 811 reads in a copy of the Corefile. Next, the controller 811 determines which are the upstream resolvers that this resolver should now forward to, based on the destination nodes in the subgraph. The controller 811 can then correlate the destination resolvers with their actual address, such as from a database. Next, the controller 811 can overwrite the configuration block for the "lrforward" plugin in the Corefile to have the same optional settings but with a new set of upstream resolver addresses. Finally, the controller 811 connects back to the resolver and overwrites the Corefile with an updated copy. Because the CoreDNS resolver has the "reload" plugin, the resolver can detect that the Corefile has changed, and the resolver can be reloaded to use the new configuration. Subsequent requests are then forwarded to the new set of upstream resolvers according to the recommended network graph as generated by the neural network 700 based on the sample datasets 802, which are DNS queries in the past period of time.

An embodiment for automated removal of non-functioning DNS resolvers is now described with reference to FIGS. 11-17B.

Figure 11:
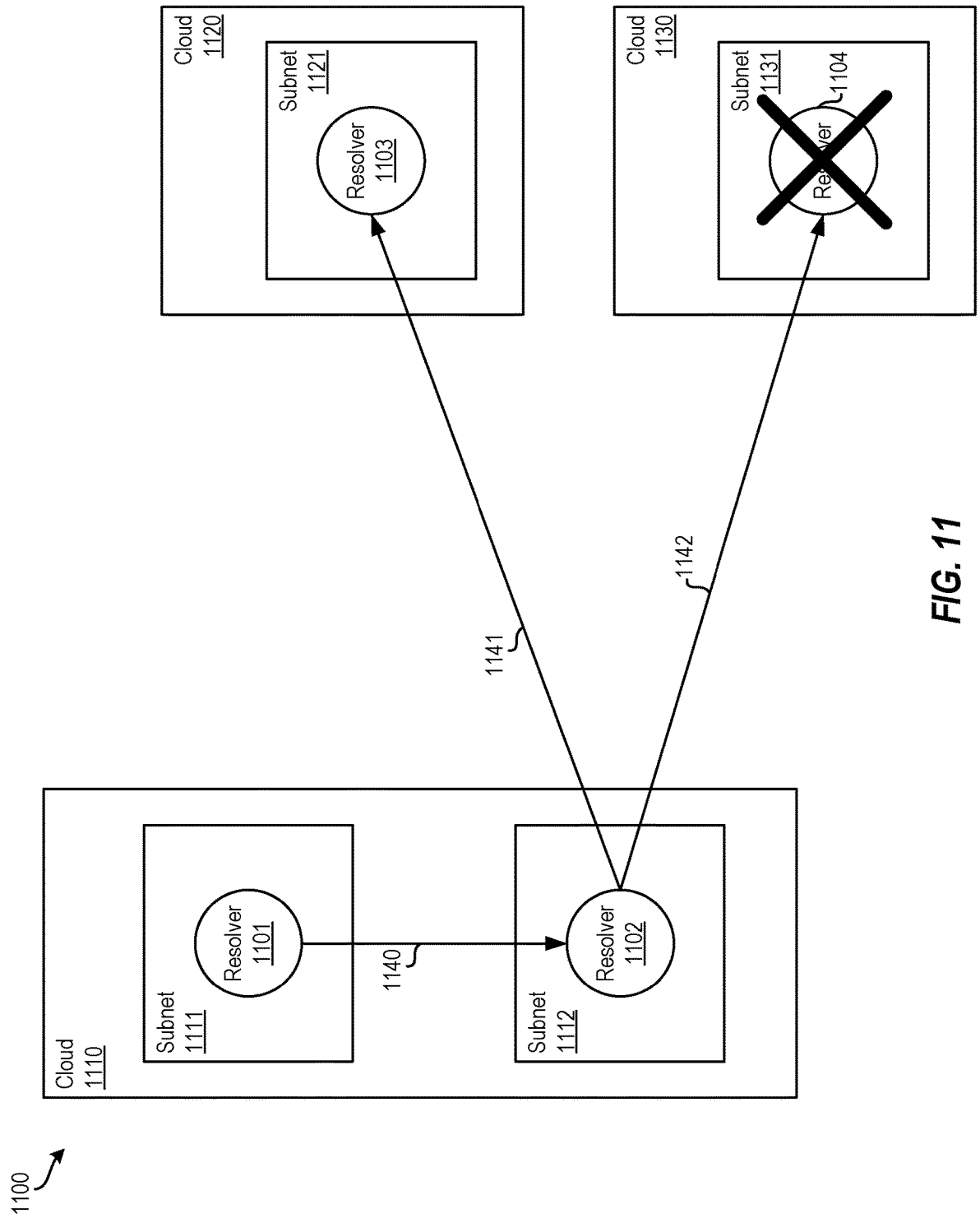
FIG. 11 depicts a resolver request forwarding graph before applying recommended DNS forwarding rules.

FIG. 11 depicts a resolver request forwarding graph 1100 before applying recommended DNS forwarding rules. The resolver request forwarding graph 1100 represents a network of resolvers 1101, 1102, 1103, 1104 deployed within clouds 1110, 1120, 1130 as shown. According to an embodiment, the network of resolvers manages multiple virtual private clouds (e.g., clouds 1110, 1120, 1130) across different providers and on-premise private clouds owned by one entity. Each cloud 1110, 1120, 1130 has its own resolver or resolvers, as shown. For example, the cloud 1110 includes the resolver 1101 within subnet 1111 and resolver 1102 within subnet 1112, the cloud 1120 includes the resolver 1103 within subnet 1121, and the cloud 1130 includes the resolver 1104 within subnet 1111. Different contributing factors may contribute to DNS resolution latencies, including different geographical distances between one cloud and another, different computing capabilities between one resolver and another, bandwidth limitations between resolvers, and/or the like, including combinations and/or multiples thereof. Also, one or more of the resolvers 301-304 may be powered by different DNS resolution applications, resulting in different configuration languages used. As shown by the links 1140, 1141, 1142, the one or more of the resolvers 1101-1104 may reference one or more of the resolvers 1101-1104 when resolving a DNS request. For example, when the resolver 1101 receives a DNS request, the resolver 1101 references the resolver 1102 via the link 1140. The resolver 1102 then references the resolvers 1103 and 1104 via the links 341 and 342 respectively. As shown, the resolver 1104 is down or unavailable, marked by an "x" on the resolver 1104. For example, the resolver 1104 may be facing an internal error and cannot respond to the DNS request. According to one or more embodiments described herein, each of the resolvers 1101-1104 may have its own controller (e.g., the controller 1511 of FIG. 15).

According to the embodiment of FIG. 11, a performant network of resolvers is one where DNS requests to an upstream resolver responds successfully and in a timely manner, to avoid DNS query timeouts.

In order to constrain a dataset to a finite set of features, some aggregating is performed. First, for example, the data for a single dataset (see, e.g., FIG. 4) is received or collected from network traffic for the network of resolvers 1101-1104 across a sample period (e.g., 5 minutes, 10 minutes, 30 minutes, and/or the like) and is for one upstream resolver of the resolvers being managed. The dataset can include query duration, response code, an initial resolver identifier, and indicators for the performance of resolver pairs (see, e.g., FIG. 4). The dataset can also include request metadata, which can be sorted by query duration. As an example, five random request metadata are chosen from the set. For a given request, from the full metadata set, the response code, the query duration, and the final attempted upstream resolver are concatenated into a single one-dimensional array. Each of the five representative request data arrays are concatenated into a single one-dimensional array representing the sample performance of the upstream resolver.

Figure 12:
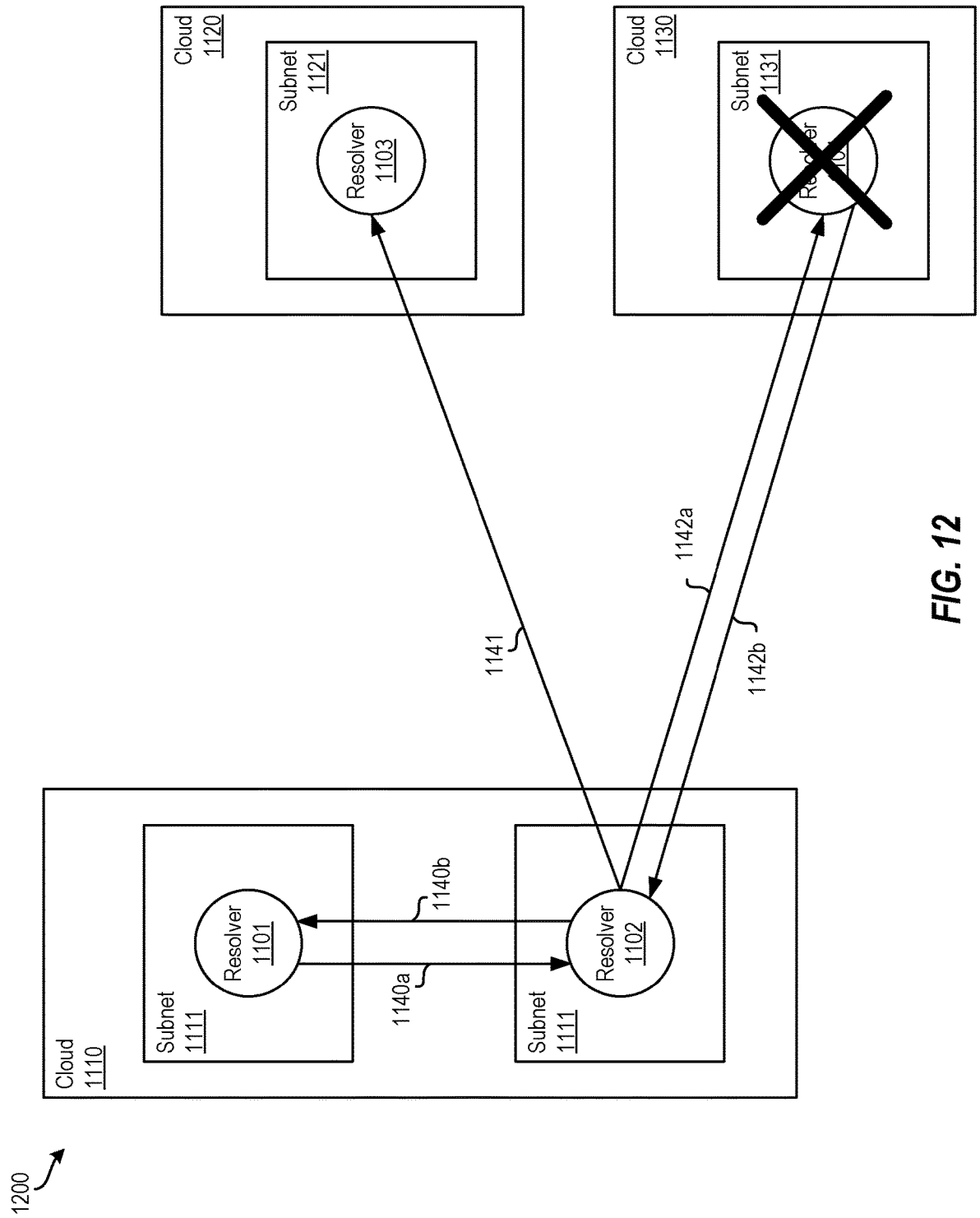
FIG. 12 depicts DNS response graph for the network of resolvers of FIG. 11 according to one or more embodiments described herein.
Figure 13A:
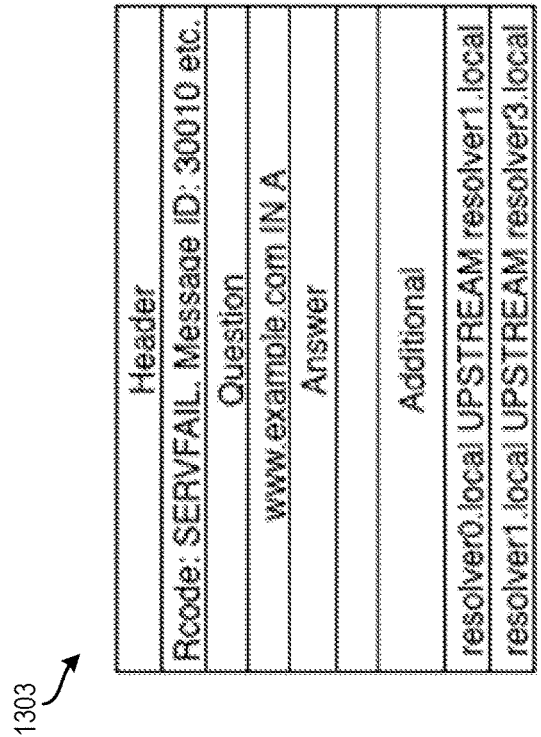
FIGS. 13A-13D depict tables of hop location metadata for the DNS response graph of FIG. 12 according to one or more embodiments described herein
Figure 13C:
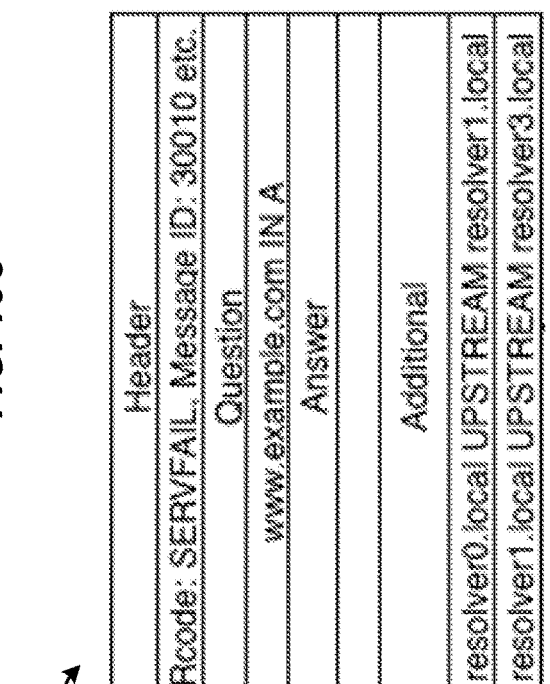
Figure 13B:
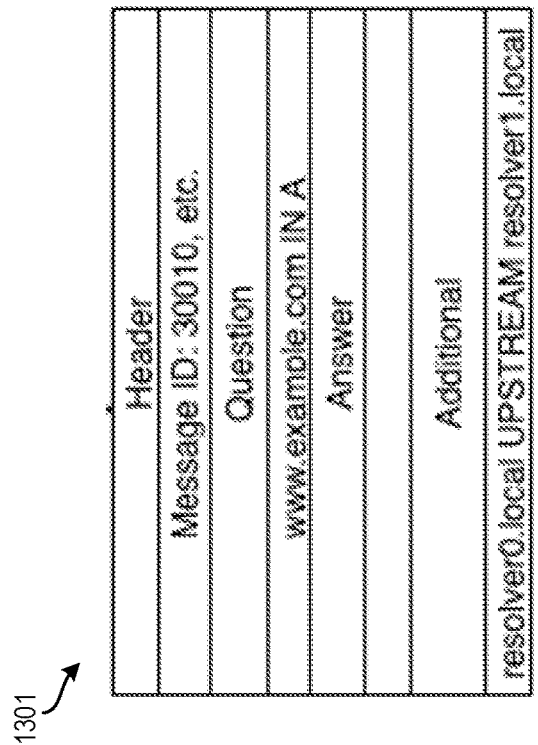
Figure 13D:
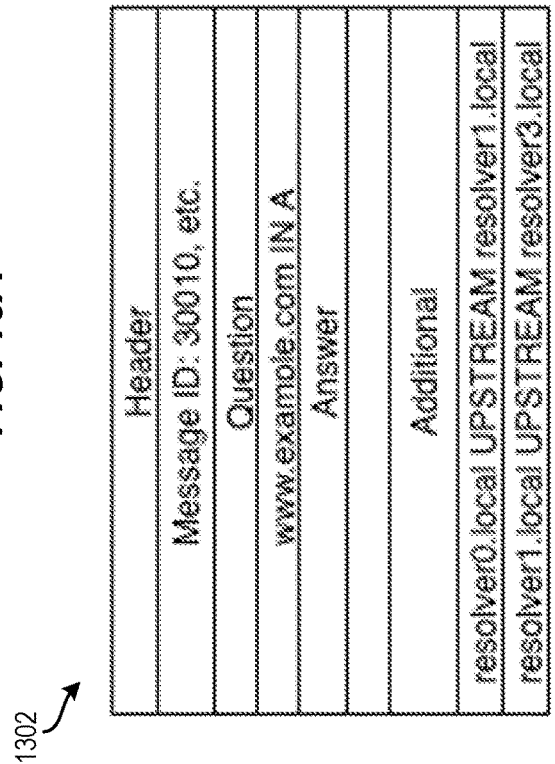

FIG. 12 depicts DNS response graph 1200 for the network of resolvers 1101-1104 of FIG. 11 according to one or more embodiments described herein. In this example, a DNS request is passed from the resolver 1101 to the resolver 1102 via the link 1140a. The resolver 1102 then passes the DNS request to the resolver 1103 via the link 1141 and the resolver 1104 via the link 1142a. The resolver 1104 returns a DNS response to the resolver 1102 via the link 1142b, and the resolver 1102 passes the DNS response to the resolver 1101 via the link 1140b. However, because the resolver 1104 is down, the DNS response "answer" information, shown in the tables 1301-1304 of FIG. 13, is empty. Along the graph 1100, each of the resolvers 301-304 passes, along with the DNS request/response, hop location metadata, which forms the "additional" section (see, e.g., FIGS. 13A-13D).

In order to gather data sets for the machine learning model (e.g., the trained model 218), the DNS-request positioning system logger is installed onto the resolvers using the UPSTREAM record type. The DNS request positioning system logger processes and adds the metadata (see tables 1301-1304) to the DNS request message in the additional section to note the current resolver and the resolver to which it intends to forward the request. This one record of metadata with these two location points represents the edge that is the path the request will take. Then, the resolver will forward the request accordingly.

In a DNS operation, once a response is generatable, the request is copied into the response. According to one or more embodiments described herein, the hop location metadata in the additional section is also copied into to the response so that the hop location metadata travels back to the originating resolver with the response. Once the response reaches back to the originating resolver, the hop location metadata is saved into a historical database with attributes to represent the sample dataset and/or attributes that may help with querying or other purposes.

Figure 14:
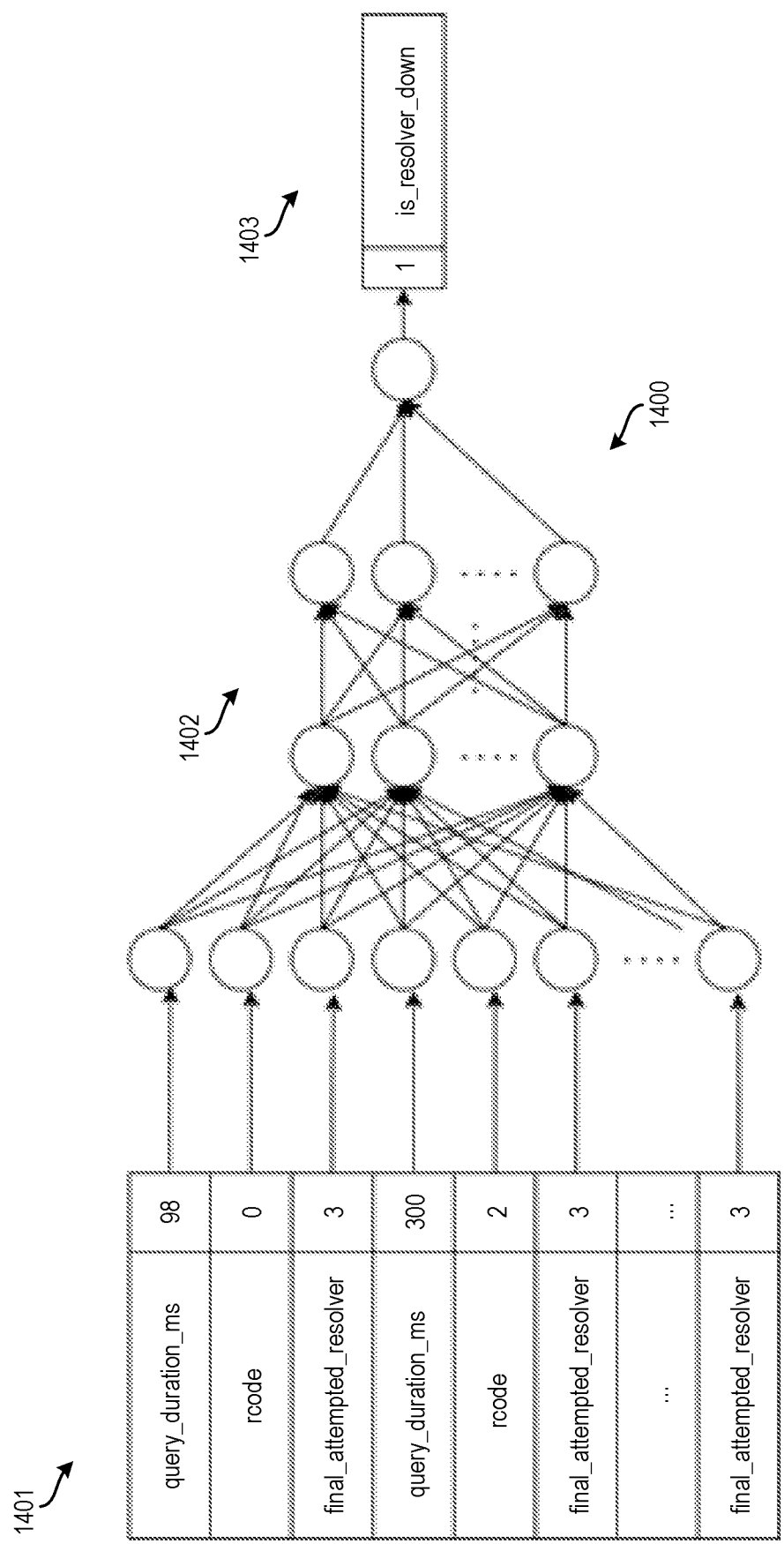
FIG. 14 depicts a neural network according to one or more embodiments described herein.

FIG. 14 depicts a neural network 1400 according to one or more embodiments described herein. In this example, the sample data is applied onto the neural network 1400, which is an example of the trained model 218.

The neural network 1400 takes input data 1401, processes the input data through one or more hidden layers 1402, and generates an output 1403, which recommends forwarding rules. According to an embodiment, the trained model 218 of FIG. 2 is the neural network 1400. The input 1401 to the neural network 1400 is a one-dimensional array representing the summary performance of the network of resolvers 1101-1104. The input 1401 can have the same features considered, in the same format, as a dataset from the training set (e.g., the same features at the training data 212). The neural network 1400 can be initially trained with some prepared dataset to prefer outputs that contain paths of the lower or lowest query durations with accurate response codes while avoiding containing paths of the higher or highest query durations and inaccurate response codes. Malfunctioning resolvers can be identified by an error code in a response, and the existence of forwarding loops can also be inferred by high query durations, which aids to avoid these scenarios.

When in use, the sample dataset is fed into the trained model 218 (e.g., the neural network 1400) to produce a Boolean (e.g., the output 1403) to indicate whether the upstream resolver considered is fit for use by the resolver the controller 811 is managing. When in use, the controller 1511 can add select sample datasets and resulting suggestions into the training datasets 1503 to become better at performing inference.

Figure 15:
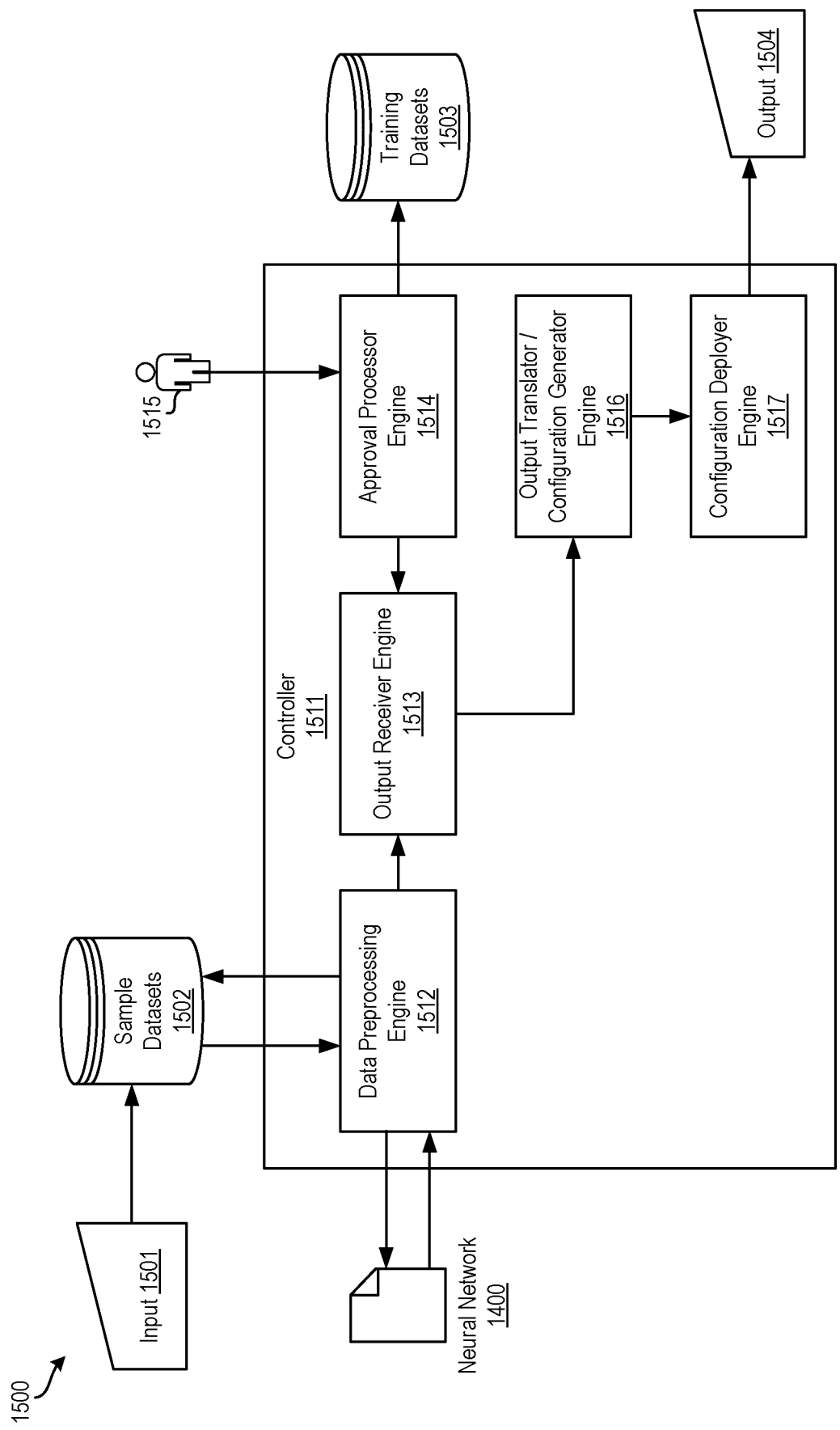
FIG. 15 depicts a system having a controller for selecting new training datasets and applying results using an approval-based approach according to one or more embodiments described herein.

FIG. 15 depicts a system 1500 having a controller 1511 for selecting new training datasets and applying results using an approval-based approach according to one or more embodiments described herein.

Figure 2:
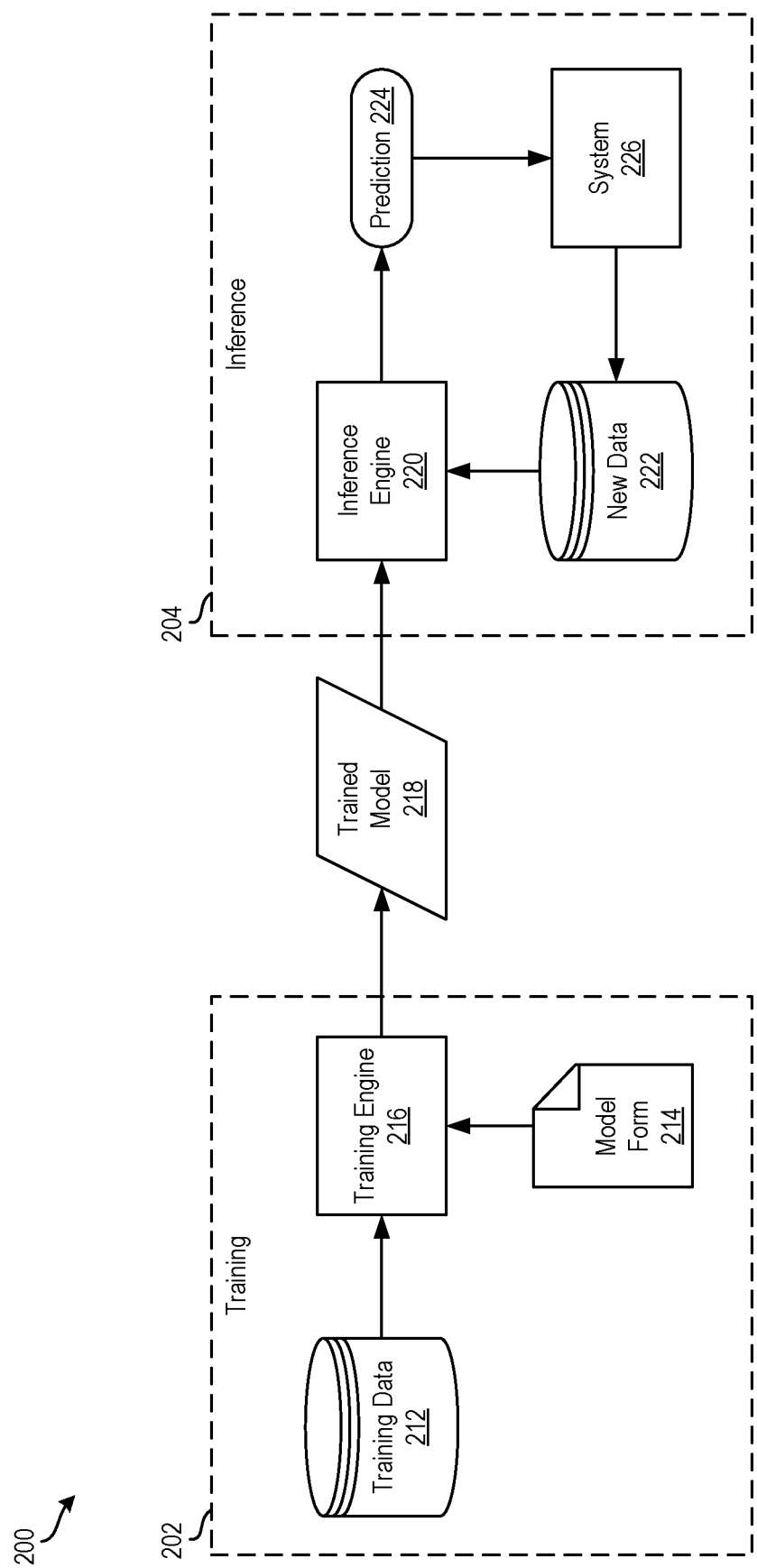
FIG. 2 depicts a block diagram of components of a machine learning training and inference system according to one or more embodiments described herein.

The controller 1511 can be any suitable system or device, such as the computing environment 100 of FIG. 1. The controller 1511 receives sample datasets 1502 based on input 1501 and generates an output 1504, which indicates forwarding rules. The controller 1511 includes a data preprocessing engine 1512, an output receiver engine 1513, an approval processor engine 1514 to receive input from a human operator 1515, an output translator/configuration generator 1516, and a configuration deployer engine 1517.

The controller 1511 uses the data preprocessing engine 1512 to perform inference using the neural network 700, which generates a recommended configuration (e.g., forwarding rules) for a network of resolvers. The recommendation is received at the output receiver engine 1513. A human operator 1515 can review and/or modify the recommendation using the approval processor engine 1514. For example, in this embodiment, the intent is to provide for automating the update of a resolver's forwarding rules in its configuration while maintaining human choice as to whether or not to save samples during runtime as training sets. At the end of each sampling period, the controller 1511 pulls and processes the dataset into a format that is recognizable and fed into the trained machine learning model (e.g., the neural network 1400) for each upstream resolver. If the trained machine learning model determines that the upstream resolvers should be used, then the controller 1511 can consider that upstream resolver for the next iteration of configuration for the resolvers being managed.

Figure 16A:
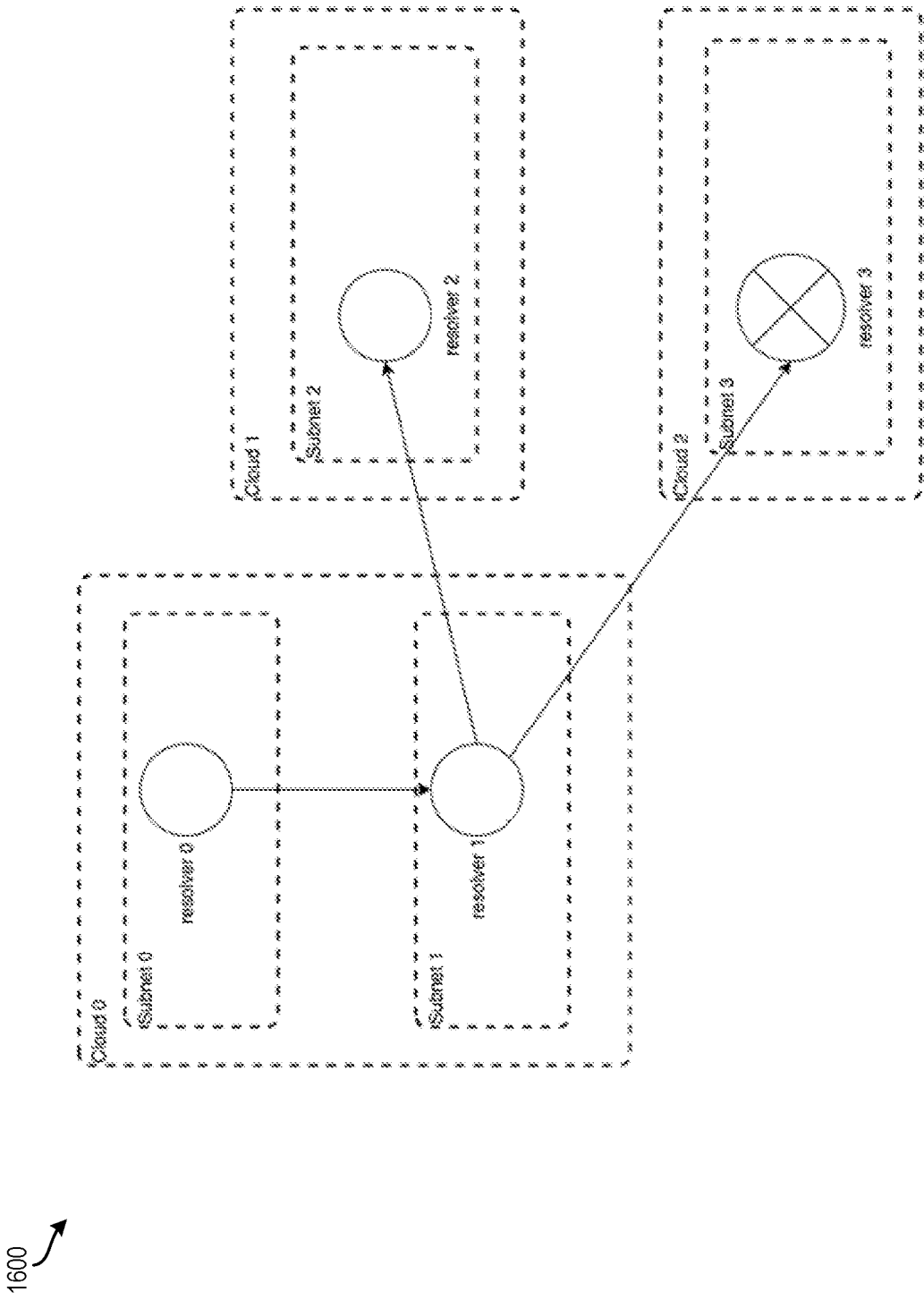
FIG. 16A depicts an original network graph according to one or more embodiments described herein.

Input 1501 represent data collected during a sampling period for a network of resolvers, such as the network 900 shown in FIG. 16A. The input 1501 is stored in the sample datasets 1502. At the end of each sampling period, for example, or at other suitable times, the controller 1511 pulls and processes the sample datasets 1502, which can include hop forwarding metadata as described herein, into a format that is recognizable and fed into the neural network 1400. For example, the sample datasets 1502 can store data in the form of table 1700 of FIG. 17A, and the data preprocessing engine 1512 can format the data from table 1700 into data as shown in the table 1701 of FIG. 17B. For each suggested configuration of resolvers (from FIG. 16A) in a graph format that the model outputs, the controller 1511 generates a notification to the human operator 1515 for review using the approval processor engine 1514. The human operator can then respond to two choices as follows.

Figure 16B:
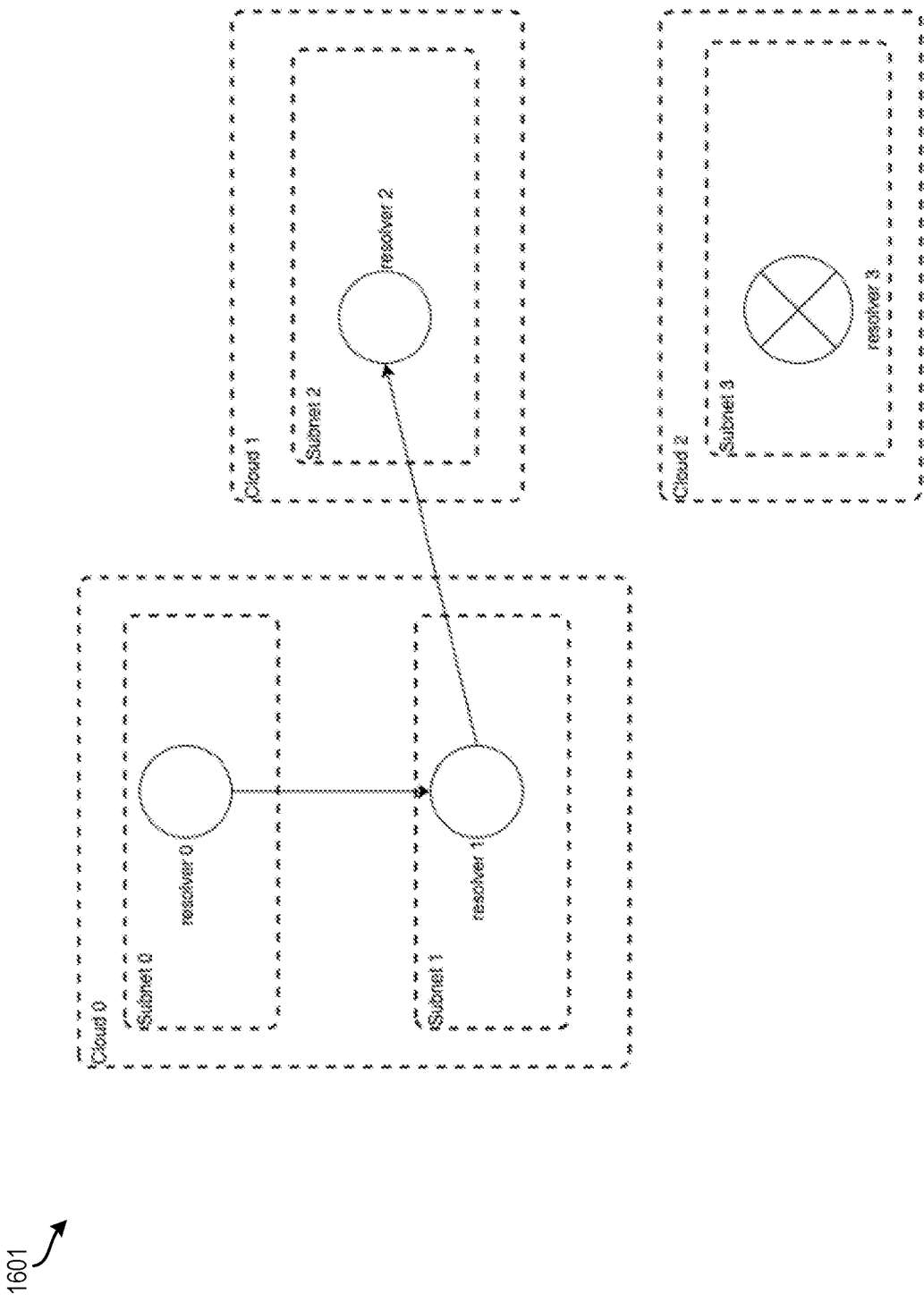
FIG. 16B depicts a recommended network graph according to one or more embodiments described herein.

Afterward, the controller 1511 translates the output of the data preprocessing engine 1512 into configuration file(s) (e.g., by the output translator/configuration generator engine 1516) and applies the output (e.g., by the configuration deployer engine 1517) to update the resolver's behavior. The configuration can then be deployed as output 804 using the configuration deployer engine 817. FIG. 16B shows a recommended network graph 1601 that results from the output 1504 of the controller 1511. FIG. 16A depicts an original network graph 1600 according to one or more embodiments described herein. FIG. 16B depicts a recommended network graph 1601 according to one or more embodiments described herein. In this example, resolver 1 is no longer forwarding to resolver 3 because the resolver 1 believes that resolver 3 is no longer fit for use (e.g., unavailable). At the same time, the human operator 1515 can choose whether or not to submit the anonymized sample dataset as the training datasets 1503 to improve the trained model (e.g., the neural network 1400) in subsequent training, so that future results will become more accurate.

An embodiment for loop detection is now described with reference to FIG. 18.

Figure 18:
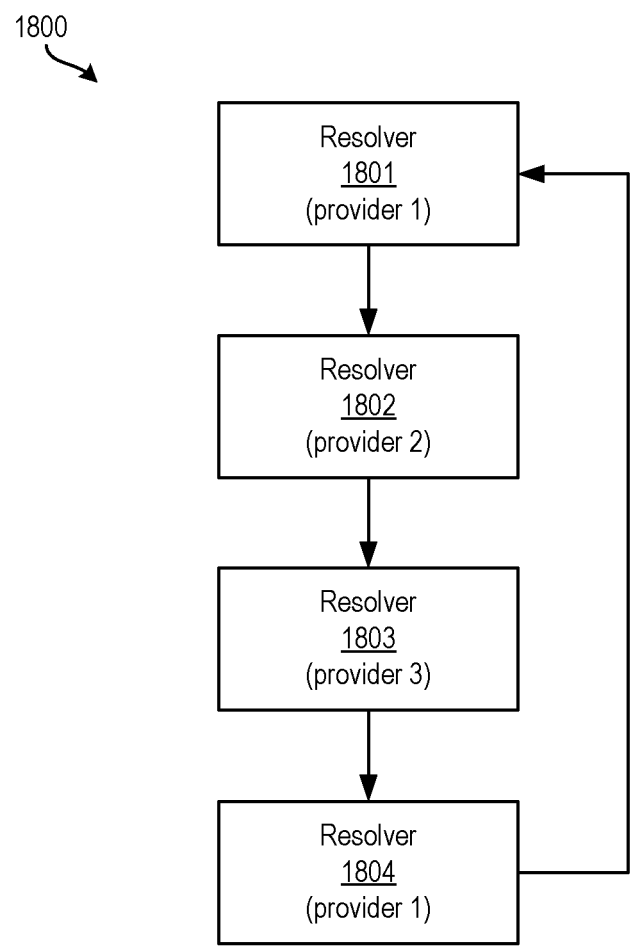
FIG. 18 depicts a network of resolvers arranged in a loop according to one or more embodiments described herein.

FIG. 18 depicts a network 1800 of resolvers arranged in a loop according to one or more embodiments described herein. For example, the resolver 1801 points to the resolver 1802, which points to the resolver 1803, which points to the resolver 1804, which points back to the originating resolver, namely the resolver 1801. This creates a loop when a DNS request is received at the resolver 1801 because the request is passed through the loop and eventually returns to the originating resolver. According to one or more embodiments described herein, the resolvers 1801-1804 can be hosted or otherwise made available by different providers. For example, the resolvers 1801, 1804 are hosted by provider 1, the resolver 1802 is hosted by provider 2, and the resolver 1803 is hosted by provider 3. By looking at the additional section, described herein, and parsing the resolvers in the additional section, one or more embodiments described herein can prepare a list of the DNS resolvers in the loop.

From FIG. 18, it can be observed that provider 1's resolvers (e.g., the resolvers 1801, 1804) are repeated in the loop. It is now described how the private cloud networks that below to the resolvers can be connected and in between forwarding can be eliminated (e.g., how the loop can be avoided).

Consider the following example. Resolvers from provider 1 (e.g., the resolvers 1801, 1804) from different virtual private clouds can be connected using transit gateway/ virtual private network (VPN) gateway as follows:

provider1.db-0.private-cloud.database. 10.128.1.4
provider1.db-0.private-cloud.database. 10.240.97.20

The in between resolvers (e.g., the resolvers 1802, 1803) can be eliminated and thus are removed from the forwarding rules as follows:

provider2.db-0.private-cloud.database. 10.215.134.162
provider3.db-0.private-cloud.database. 10.190.197.11

The additional section information can be identified to inform the loop, as follows:

;; ADDITIONAL SECTION:
LOOP1.provider1.db-0.private-cloud.database. 300146 IN UPSTREAM 10.128.1.4
provider2.private-cloud.database.REMOVE 308505 IN UPSTREAM 10.215.134.162
provider3.db-0.private-cloud.database.REMOVE 303470 IN UPSTREAM 10.190.197.11
LOOP1.provider1.db-0.private-cloud.database. 303470 IN UPSTREAM 10.240.97.20

According to one or more embodiments described herein, the additional section information can be used to update/ correct forwarding rules to avoid the loop. A transit gateway/ VPN gateway or other suitable gateway can be used to connect the resolvers for provider 1 (e.g., the resolvers 1801, 1804).

According to one or more embodiments described herein, the chain of DNS resolvers and results for the DNS query can be cached/saved. Once the DNS looping is detected, the looping issue is cached for the DNS query in the hybrid cloud environment according to an embodiment. This improves performance as the DNS resolvers do not need to be evaluated again.

An embodiment for visiting nodes is now described.

Visiting nodes can be temporarily added to a network of resolvers, such as the resolvers 301-304 of FIG. 3. A DNS resolver can be a bind or coredns resolver, for example. According to an example where the DNS resolver is a coredns resolver, the coredns resolver has a Corefile file, which contains configuration of a plugin that performs forwarding, specifying the forwarding behavior in forwarding rules. For example, with reference to FIG. 18, the resolver 1801, when the domain is db-0.private-cloud.database, forwards to the resolver 1802 by IP address. A "whoami" request returns the IP address of the resolver that is processing the query. Consider the following example:

db-0.private-cloud.database {
  forward {
  . 10.215.134.162
  additional  "ibm.db-0.private-cloud.database".
  whoami}
}

In the forward plugin, a serveDNS( ) function implements the query handler and adds the additional section with the visiting DNS resolver's IP address. This can be done, for example, using the following pseudo code:

// Msg contains the layout of a DNS message.
// ServeDNS implements plugin.Handler.
func (f*Forward) ServeDNS(ctx context.Context, w dns-.ResponseWriter, r *dns.Msg) (int, error) {
dns.Msg.Extra={ } // Fetch the existing additional section append the current ip address in additional section
detectLoop( )
}
func detectLoop( )
//set flags to RCODE with 2—Server error
// Output recommendations, suggestions to fix server error in additional section
}
func detectDNSResolverIsResponding( ) {
//Invoke ML DNS Resolver
}

In the forward plugin, a detectLoop( ) function can be invoked, which detects the DNS loop from the additional section within the chain of DNS resolvers (see, e.g., FIG. 18). Once the loop is detect, the an error code can be added in the rcode section of DNS query as shown below as RCODE2, and the flags section will output RCODE2 which is an internal server failure.

root@malar-test:~#dig db-0.private-cloud.database
; << >> DiG 9.11.3-1ubuntu1.16-Ubuntu << >> db-0.private-cloud.database
;; global options: +cmd
;; Got answer:
;; ->>HEADER<<- opcode: QUERY, status: SERVFAIL, id: 38660
;; flags: qr rd ra; QUERY: 1, ANSWER: 1, AUTHORITY: 0, ADDITIONAL: 1
;; QUESTION SECTION:
; db-0.private-cloud.database. IN A
;; ANSWER SECTION:
db-0.private-cloud.database. 900INA3.3.3.3
;; ADDITIONAL SECTION:
LOOP1.provider1.db-0.private-cloud.database. 300146 IN UPSTREAM 10.128.1.4
provider2.db-0.private-cloud.database.REMOVE 308505 IN UPSTREAM 10.215.134.162
provider3.db-0.private-cloud.database.REMOVE 303470 IN UPSTREAM 10.190.197.11
LOOP1.provider1.db-0.private-cloud.database. 303470 IN UPSTREAM 10.240.97.20
;; Query time: 218 msec
;; SERVER: 127.0.0.53 #53(127.0.0.53)
;; WHEN: Fri Dec 24 06:29:59 UTC 2021
;; MSG SIZE rcvd: 72

According to one or more embodiments described herein, the additional section can be modified where loops are detected. For example, if there are multiple loops detected, then LOOP1, LOOP2, etc. can be appended in front of the DNS resolvers. In between resolvers, the detected loop can be modified/eliminated as described herein.

Conventional approaches to load balancing cannot self-optimize to higher performing resolver technologies, cannot add/remove resolvers from the DNS forwarding network dynamically and cannot calculate weightage dynamically, cannot detect DNS forwarding loops within a cloud or across a hybrid or multi-cloud, and cannot detect chains of DNS resolvers used for resolving DNS queries.

One or more embodiments described herein addresses these and other shortcomings by using machine learning to configure DNS forwarding rules dynamically inter higher performing DNS resolver technology, by detecting DNS looping from historical data, by suggesting/recommending how to eliminate DNS looping, by revealing chains of DNS resolvers in answer for further learning/recommendations, and/or the like, including combinations and/or multiples thereof.

One or more embodiments described herein provide a neural network-based load balancing approach for DNS forwarding. For each DNS query, the query performance and the forwarding path from the DNS additional section, as described herein, are returned. The forwarding paths and performance data sets can be fed into the trained neural network to generate a suggested resolver forwarding topology in the form of an edge-adjacency matrix representation of a resolver forwarding topology. A human operator (e.g., a network admin) can apply the suggested DNS resolver configuration translated from the recommendations from the neural network. From the collected past history of DNS queries, the neural network can be further trained/improved.

Figure 19:
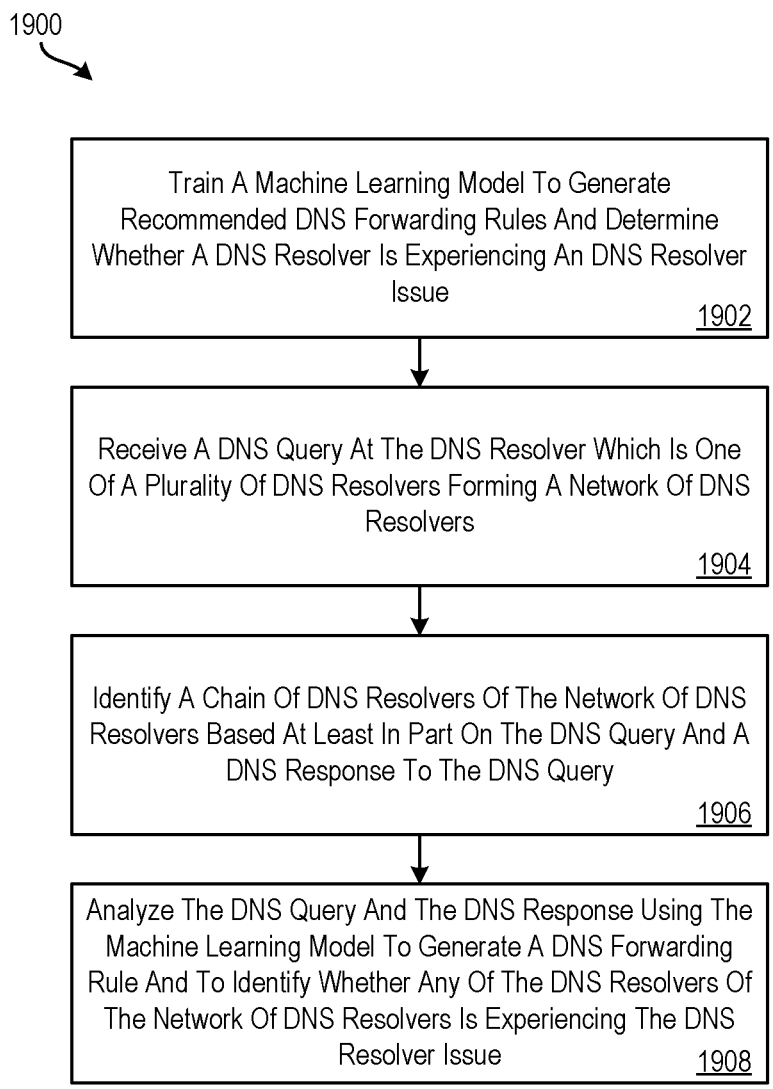
FIG. 19 depicts a flow diagram of a method for determining domain name system (DNS) forwarding rules according to one or more embodiments described herein.

FIG. 19 depicts a flow diagram of a method 1900 for determining domain name system (DNS) forwarding rules according to one or more embodiments described herein. The method 1900 can be implemented by any suitable system or device, such as the computing environment 100 of FIG. 1, the machine learning training and inference system 200 of FIG. 2, the controller 811 of FIG. 8, the controller 1511 of FIG. 15, and/or the like, including combinations and/or multiples thereof.

At block 1902, the controller 811 trains a machine learning model (e.g., the neural network 700) to generate recommended DNS forwarding rules and determine whether a DNS resolver is experiencing an DNS resolver issue. At block 1904, the controller 811 receives a DNS query at the DNS resolver (e.g., the resolver 301) which is one of a plurality of DNS resolvers forming a network of DNS resolvers (e.g., the resolvers 301-304). At block 1906, the controller 811 identifies a chain of DNS resolvers of the network of DNS resolvers based at least in part on the DNS query and a DNS response to the DNS query. At block 1908, the controller 811 analyzes the DNS query and the DNS response using the machine learning model to generate a DNS forwarding rule (e.g., the output 804) and to identify whether any of the DNS resolvers of the network of DNS resolvers is experiencing the DNS resolver issue (e.g., a loop).

Additional processes also may be included, and it should be understood that the process depicted in FIG. 19 represents an illustration, and that other processes may be added or existing processes may be removed, modified, or rearranged without departing from the scope of the present disclosure.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for determining domain name system (DNS) forwarding rules comprising:
    training a machine learning model to generate recommended DNS forwarding rules and determine whether a DNS resolver is experiencing an DNS resolver issue;
    receiving a DNS query at the DNS resolver which is one of a plurality of DNS resolvers forming a network of DNS resolvers;
    identifying a chain of DNS resolvers of the network of DNS resolvers based at least in part on the DNS query and a DNS response to the DNS query; and
    analyzing the DNS query and the DNS response using the machine learning model to generate a DNS forwarding rule and to identify whether any of the plurality of DNS resolvers of the network of DNS resolvers is experiencing the DNS resolver issue,
    wherein the DNS forwarding rule generated by the machine learning model is encoded as an adjacency matrix modelling recommended forwarding rules as a code agnostic format that is a directed graph of the plurality of DNS resolvers of the network of DNS resolvers.

2. The computer-implemented method of claim 1, further comprising implementing the DNS forwarding rule.

3. The computer-implemented method of claim 1, further comprising taking a corrective action to resolve the DNS resolver issue.

4. The computer-implemented method of claim 3, wherein the DNS resolver issue is a DNS loop, wherein the corrective action is updating forwarding rules to avoid the DNS loop.

5. The computer-implemented method of claim 1, wherein the machine learning model is a neural network architecture suitable for processing time-series data.

6. The computer-implemented method of claim 5, wherein the neural network architecture is a convolutional neural network architecture.

7. The computer-implemented method of claim 5, wherein the neural network architecture is a recurrent neural network architecture.

8. A system comprising:
    a memory comprising computer readable instructions; and
    a processing device for executing the computer readable instructions, the computer readable instructions controlling the processing device to perform operations for determining domain name system (DNS) forwarding rules, the operations comprising:
- training a machine learning model to generate recommended DNS forwarding rules and determine whether a DNS resolver is experiencing an DNS resolver issue;
- receiving a DNS query at the DNS resolver which is one of a plurality of DNS resolvers forming a network of DNS resolvers;
- identifying a chain of DNS resolvers of the network of DNS resolvers based at least in part on the DNS query and a DNS response to the DNS query; and
- analyzing the DNS query and the DNS response using the machine learning model to generate a DNS forwarding rule and to identify whether any of the plurality of DNS resolvers of the network of DNS resolvers is experiencing the DNS resolver issue,
- wherein the DNS forwarding rule generated by the machine learning model is encoded as an adjacency matrix modelling recommended forwarding rules as a code agnostic format that is a directed graph of the plurality of DNS resolvers of the network of DNS resolvers.

9. The system of claim 8, the operations further comprising implementing the DNS forwarding rule.

10. The system of claim 8, the operations further comprising taking a corrective action to resolve the DNS resolver issue.

11. The system of claim 10, wherein the DNS resolver issue is a DNS loop, wherein the corrective action is updating forwarding rules to avoid the DNS loop.

12. The computer-implemented method of claim 8, wherein the machine learning model is a neural network architecture suitable for processing time-series data.

13. The computer-implemented method of claim 12, wherein the neural network architecture is a convolutional neural network architecture.

14. The computer-implemented method of claim 12, wherein the neural network architecture is a recurrent neural network architecture.

15. A computer program product comprising a computer readable storage medium having program instructions embodied therewith, the program instructions executable by a processor to cause the processor to perform operations for determining domain name system (DNS) forwarding rules, the operations comprising:
- training a machine learning model to generate recommended DNS forwarding rules and determine whether a DNS resolver is experiencing an DNS resolver issue;
- receiving a DNS query at the DNS resolver which is one of a plurality of DNS resolvers forming a network of DNS resolvers;
- identifying a chain of DNS resolvers of the network of DNS resolvers based at least in part on the DNS query and a DNS response to the DNS query; and
- analyzing the DNS query and the DNS response using the machine learning model to generate a DNS forwarding rule and to identify whether any of the plurality of DNS resolvers of the network of DNS resolvers is experiencing the DNS resolver issue,
- wherein the DNS forwarding rule generated by the machine learning model is encoded as an adjacency matrix modelling recommended forwarding rules as a code agnostic format that is a directed graph of the plurality of DNS resolvers of the network of DNS resolvers.

16. The computer program product of claim 15, the operations further comprising implementing the DNS forwarding rule.

17. The computer program product of claim 15, the operations further comprising taking a corrective action to resolve the DNS resolver issue.

18. The computer program product of claim 17, wherein the DNS resolver issue is a DNS loop, wherein the corrective action is updating forwarding rules to avoid the DNS loop.

* * * * *